US008926080B2

(12) United States Patent
Mozel et al.

(10) Patent No.: US 8,926,080 B2
(45) Date of Patent: Jan. 6, 2015

(54) FORMALDEHYDE-FREE INKJET COMPOSITIONS AND PROCESSES

(75) Inventors: Jacob Mozel, Kfar-Saba (IL); Jacob Mann, Zoran (IL)

(73) Assignee: Kornit Digital Ltd., Rosh HaAyin (IL)

( * ) Notice: Subject to any disclaimer, the term of this patent is extended or adjusted under 35 U.S.C. 154(b) by 144 days.

(21) Appl. No.: 13/206,646

(22) Filed: Aug. 10, 2011

(65) Prior Publication Data

US 2012/0040148 A1 Feb. 16, 2012

Related U.S. Application Data

(60) Provisional application No. 61/372,123, filed on Aug. 10, 2010.

(51) Int. Cl.

| | |
|---|---|
| ***C09D 11/00*** | (2014.01) |
| ***D06P 1/56*** | (2006.01) |
| ***B41M 5/00*** | (2006.01) |
| ***D06P 5/00*** | (2006.01) |
| ***D06P 1/649*** | (2006.01) |
| ***D06P 1/54*** | (2006.01) |
| ***D06P 1/642*** | (2006.01) |
| ***D06P 1/673*** | (2006.01) |
| ***D06P 5/30*** | (2006.01) |

(52) U.S. Cl.

CPC ................ *B41M 5/0011* (2013.01); *D06P 1/56* (2013.01); *B41M 5/0023* (2013.01); *D06P 5/002* (2013.01); *D06P 1/649* (2013.01); *D06P 1/54* (2013.01); *D06P 1/6425* (2013.01); *D06P 1/673* (2013.01); *D06P 5/30* (2013.01); *D06P 1/6493* (2013.01)

USPC .......................................................... 347/100

(58) Field of Classification Search

USPC .......................................................... 347/100

See application file for complete search history.

(56) References Cited

U.S. PATENT DOCUMENTS

| | | | |
|---|---|---|---|
| 2,123,638 | A | 7/1938 | Steccone |
| 3,100,704 | A | 8/1963 | Coles et al. |
| 3,968,498 | A | 7/1976 | Uchiyama |
| 3,990,363 | A | 11/1976 | Vertegaal |
| 4,021,591 | A | 5/1977 | De Vries et al. |
| 4,284,758 | A | 8/1981 | North |
| 4,285,690 | A | 8/1981 | North |
| 4,296,421 | A | 10/1981 | Hara et al. |
| 4,312,007 | A | 1/1982 | Winfield |

(Continued)

FOREIGN PATENT DOCUMENTS

| | | |
|---|---|---|
| CN | 1676547 | 10/2005 |
| EP | 0121083 | 10/1984 |

(Continued)

OTHER PUBLICATIONS

Notice of Allowance Dated Apr. 22, 2013 From the US Patent and Trademark Office Re. U.S. Appl. No. 12/853,389.

(Continued)

*Primary Examiner* — Laura Martin

(57) ABSTRACT

Disclosed are a process for inkjet printing color images on various substrates using a formaldehyde-free crosslinking agent in the ink composition, which is therefore devoid of formaldehyde emission and suitable for health-aware manufacturing practices, as well as objects having images and designs printed thereon which are devoid of formaldehyde and therefore suitable for use by infants.

25 Claims, 12 Drawing Sheets

(56) References Cited

U.S. PATENT DOCUMENTS

| | | | |
|---|---|---|---|
| 4,345,063 | A | 8/1982 | North |
| 4,380,770 | A | 4/1983 | Maruyama |
| 4,630,076 | A | 12/1986 | Yoshimura |
| 4,702,742 | A | 10/1987 | Iwata et al. |
| 4,888,093 | A | 12/1989 | Dean et al. |
| 5,348,997 | A | 9/1994 | Kato et al. |
| 5,349,021 | A | 9/1994 | Rooney et al. |
| 5,360,933 | A | 11/1994 | Imashiro et al. |
| 5,432,229 | A | 7/1995 | Aoki et al. |
| 5,501,902 | A | 3/1996 | Kronzer |
| 5,510,415 | A | 4/1996 | Zahrobsky et al. |
| 5,534,904 | A | 7/1996 | Sheinman |
| 5,582,104 | A | 12/1996 | Best et al. |
| 5,594,044 | A | 1/1997 | Yang |
| 5,596,047 | A | 1/1997 | Wu et al. |
| 5,631,684 | A | 5/1997 | Takaide et al. |
| 5,645,888 | A | 7/1997 | Titterington et al. |
| 5,757,407 | A | 5/1998 | Rezanka |
| 5,798,179 | A | 8/1998 | Kronzer |
| 5,820,661 | A | 10/1998 | Gregory et al. |
| 5,858,514 | A | 1/1999 | Bowers |
| 5,885,335 | A | 3/1999 | Adams et al. |
| 5,902,387 | A | 5/1999 | Suzuki et al. |
| 5,981,113 | A | 11/1999 | Christian |
| 5,988,791 | A | 11/1999 | Miyashita et al. |
| 6,042,228 | A | 3/2000 | Yamada et al. |
| 6,059,391 | A | 5/2000 | Fulkerson et al. |
| 6,063,922 | A | 5/2000 | Flood et al. |
| 6,087,061 | A | 7/2000 | Hare et al. |
| 6,095,628 | A | 8/2000 | Rhome |
| 6,117,921 | A | 9/2000 | Ma et al. |
| 6,124,398 | A | 9/2000 | Imashiro et al. |
| 6,126,281 | A | 10/2000 | Shimoda et al. |
| 6,132,502 | A | 10/2000 | Yatake |
| 6,140,391 | A | 10/2000 | Zou et al. |
| 6,156,072 | A | 12/2000 | Usui et al. |
| 6,161,929 | A | 12/2000 | Erdtmann et al. |
| 6,183,079 | B1 | 2/2001 | Meade et al. |
| 6,196,674 | B1 | 3/2001 | Takemoto |
| 6,200,667 | B1 | 3/2001 | Haruta et al. |
| 6,206,516 | B1 | 3/2001 | Moriyama et al. |
| 6,262,796 | B1 | 7/2001 | Loopstra et al. |
| 6,267,518 | B1 | 7/2001 | Abe |
| 6,270,189 | B1 | 8/2001 | Miyashita et al. |
| 6,291,023 | B1 | 9/2001 | Nigam |
| 6,300,391 | B2 | 10/2001 | Parazak et al. |
| 6,322,620 | B1 | 11/2001 | Xiao |
| 6,326,419 | B1 | 12/2001 | Smith |
| 6,335,140 | B1 | 1/2002 | Miyazaki |
| 6,341,856 | B1 | 1/2002 | Thompson et al. |
| 6,416,923 | B2 | 7/2002 | Miyazaki |
| 6,450,633 | B1 | 9/2002 | Kronzer |
| 6,464,649 | B1 | 10/2002 | Duchon et al. |
| 6,500,880 | B1 | 12/2002 | Parazek |
| 6,513,924 | B1 | 2/2003 | Goldberg et al. |
| 6,517,199 | B1 | 2/2003 | Tomioka et al. |
| 6,536,894 | B1 | 3/2003 | Rasmussen |
| 6,606,427 | B1 | 8/2003 | Graves et al. |
| 6,626,530 | B2 | 9/2003 | Snow et al. |
| 6,647,208 | B1 | 11/2003 | Kirby |
| 6,682,189 | B2 | 1/2004 | May et al. |
| 6,698,874 | B2 | 3/2004 | Katsuki |
| 6,755,518 | B2 | 6/2004 | Codos |
| 6,785,436 | B2 | 8/2004 | Ravikanth et al. |
| 6,840,992 | B2 | 1/2005 | Glaum et al. |
| 6,879,378 | B2 | 4/2005 | Morita et al. |
| 7,119,160 | B2 | 10/2006 | Kodama et al. |
| 7,134,749 | B2 | 11/2006 | Ben Zur et al. |
| 7,381,347 | B2 | 6/2008 | Jacobs, III et al. |
| 7,425,062 | B2 | 9/2008 | Bauer |
| 7,723,400 | B2 | 5/2010 | Kobayashi et al. |
| 7,748,838 | B2 | 7/2010 | Oishi |
| 2002/0009662 | A1 | 1/2002 | Miyazaki |
| 2002/0022120 | A1 | 2/2002 | Katsuki et al. |
| 2002/0060728 | A1 | 5/2002 | Koizumi et al. |
| 2003/0117473 | A1 | 6/2003 | Smith |
| 2003/0142167 | A1 | 7/2003 | Nakamura et al. |
| 2003/0157304 | A1 | 8/2003 | Li et al. |
| 2003/0172840 | A1 | 9/2003 | Blank et al. |
| 2003/0197750 | A1 | 10/2003 | Iwatsuki et al. |
| 2003/0197772 | A1 | 10/2003 | Iwatsuki et al. |
| 2003/0205159 | A1 | 11/2003 | McNeil |
| 2004/0252173 | A1 | 12/2004 | Ben-Zur et al. |
| 2005/0098054 | A1 | 5/2005 | Berndtsson et al. |
| 2005/0179706 | A1 | 8/2005 | Childers |
| 2005/0179708 | A1 | 8/2005 | Ben-Zur |
| 2006/0249039 | A1 | 11/2006 | Feldman et al. |
| 2007/0103528 | A1 | 5/2007 | Pearl et al. |
| 2007/0103529 | A1 | 5/2007 | Pearl et al. |
| 2007/0104899 | A1 | 5/2007 | Pearl et al. |
| 2007/0148128 | A1 | 6/2007 | Kennedy et al. |
| 2007/0218222 | A1 | 9/2007 | Campbell et al. |
| 2007/0229577 | A1 | 10/2007 | Morimoto |
| 2008/0006176 | A1* | 1/2008 | Houjou ...................... 106/31.13 |
| 2008/0012884 | A1 | 1/2008 | Ben-Zur et al. |
| 2008/0108746 | A1* | 5/2008 | Waki et al. .................... 524/590 |
| 2008/0241436 | A1 | 10/2008 | Kobayashi |
| 2008/0268156 | A1 | 10/2008 | Ueno et al. |
| 2009/0122127 | A1 | 5/2009 | Baker |
| 2010/0075045 | A1 | 3/2010 | Kaimoto et al. |
| 2011/0290127 | A1 | 12/2011 | Biel et al. |
| 2014/0036014 | A1 | 2/2014 | Mozel et al. |

FOREIGN PATENT DOCUMENTS

| | | |
|---|---|---|
| EP | 0277361 | 8/1988 |
| EP | 1281533 | 2/2003 |
| EP | 2166046 | 3/2010 |
| GB | 422488 | 1/1935 |
| IL | 162231 | 5/2007 |
| JP | 59-187029 | 10/1984 |
| JP | 61-075870 | 4/1986 |
| JP | 63-031593 | 6/1988 |
| JP | 05-293954 | 11/1993 |
| JP | 08-232176 | 9/1996 |
| JP | 09-039365 | 2/1997 |
| JP | 10-278379 | 10/1998 |
| JP | 11-138768 | 5/1999 |
| JP | 2002-036644 | 2/2002 |
| JP | 2002-332437 | 11/2002 |
| JP | 2003-312069 | 11/2003 |
| JP | 2004-532750 | 10/2004 |
| JP | 2005-320663 | 11/2005 |
| WO | WO 98/30749 | 7/1998 |
| WO | WO 99/56948 | 11/1999 |
| WO | WO 00/73570 | 12/2000 |
| WO | WO 01/17792 | 3/2001 |
| WO | WO 01/32974 | 5/2001 |
| WO | WO 01/49504 | 7/2001 |
| WO | WO 02/066565 | 8/2002 |
| WO | WO 02/078958 | 10/2002 |
| WO | WO 2005/076730 | 8/2005 |
| WO | WO 2005/115089 | 12/2005 |
| WO | WO 2005/115761 | 12/2005 |

OTHER PUBLICATIONS

Restriction Official Action Dated Aug. 6, 2012 From the US Patent and Trademark Office Re. U.S. Appl. No. 12/853,389.

Official Action Dated Aug. 21, 2012 From the US Patent and Trademark Office Re. U.S. Appl. No. 12/853,361.

Communication Pursuant to Article 94(3) EPC Dated Nov. 12, 2009 From the European Patent Office Re.: Application No. 05703208.8.

Communication Under Rule 71(3) EPC Dated Sep. 5, 2011 From the European Patent Office Re. Application No. 05703208.8.

International Preliminary Report on Patentability Dated Dec. 14, 2006 From the International Bureau of WIPO Re.: Application No. PCT/il/2005/000558.

International Preliminary Report on Patentability Dated Jul. 17, 2007 From the International Preliminary Examining Authoirty Re.: Application No. PCT/IL05/00166.

(56) References Cited

OTHER PUBLICATIONS

International Preliminary Report on Patentability Dated Nov. 26, 2007 From the International Preliminary Examining Authority Re.: Application No. PCT/IL05/00559.
International Preliminary Report on Patentahillity Dated Feb. 8, 2007 From the International Preliminary Examining Authority Re.: Application No. PCT/IL05/00166.
International Preliminary Report on Patentabillity Dated Nov. 29, 2011 From the International Preliminary Examining Authority Re.: Application No. PCT/IL05/00166.
International Search Report Dated Jan. 4, 2006 From the International Searching Authority Re.: Application No. PCT/IL05/00559.
International Search Report Dated Jan. 9, 2007 From the International Searching Authority Re.: Application No. PCT/IL05/00166.
International Search Report Dated Sep. 19, 2006 From the International Searching Authority Re.: Application No. PCT/IL0500558.
Notice of Allowance Dated Feb. 3, 2011 From the US Patent and Trademark Office Re.: U.S. Appl. No. 10/589,234.
Notice of Allowance Dated Jul. 30, 2009 From the US Patent and Trademark Office Re.: U.S. Appl. No. 10/776,163.
Office Action Dated Jul. 3, 2006 From the Israeli Patent Office Re.: Application No. 162231 and Its Translation Into English.
Office Action Dated Dec. 7, 2010 From the Israel Patent Office Re. Application No. 179765 and Its Translation Into English.
Office Action Dated Aug. 18, 2010 From the Israeli Patent Office Re.: Application No. 163459 and Its Translation Into English.
Office Action Dated Feb. 21, 2006 From the Israeli Patent Office Re.: Application No. 162231 and Its Translation Into English.
Office Action Dated Mar. 24, 2011 From the Israeli Patent Office Re.: Application No. 177323 and Its Translation Into English.
Office Action Dated Aug. 26, 2009 From the Israeli Patent Office Re.: Application No. 177323 and Its Translation Into English.
Office Action Dated Jul. 28, 2010 From the Israeli Patent Office Re.: Application No. 177323 and Its Translation Into English.
Official Action Dated Dec. 6, 2010 From the US Patent and Trademark Office Re.: U.S. Appl. No. 10/589,234.
Official Action Dated May 7, 2009 From the US Patent and Trademark Office Re.: U.S. Appl. No. 11/588,277.
Official Action Dated Sep. 7, 2010 From the US Patent and Trademark Office Re.: U.S. Appl. No. 10/589,234.
Official Action Dated Feb. 8, 2011 From the US Patent and Trademark Office Re.: U.S. Appl. No. 11/606,242.
Official Action Dated Mar. 10, 2006 From the US Patent and Trademark Office Re.: U.S. Appl. No. 10/461,414.
Official Action Dated May 11, 2007 From the US Patent and Trademark Office Re.: U.S. Appl. No. 10/776,163.
Official Action Dated May 14, 2009 From the US Patent and Trademark Office Re.: U.S. Appl. No. 11/606,242.
Official Action Dated Jul. 17, 2008 From the US Patent and Trademark Office Re.: U.S. Appl. No. 11/606,154.
Official Action Dated Jul. 17, 2008 From US Patent and Trademark Office Re.: U.S. Appl. No. 11/606,154.
Official Action Dated Nov. 19, 2007 From the US Patent and Trademark Office Re.: U.S. Appl. No. 10/776,163.
Official Action Dated Oct. 19, 20108 From US Patent and Trademark Office Re.: U.S. Appl. No. 90/009,646.
Official Action Dated Aug. 20, 2008 From the US Patent and Trademark Office Re. : U.S. Appl. No. 10/776,163.
Official Action Dated Apr. 22, 2010 From the US Patent and Trademark Office Re.: U.S. Appl. No. 90/009,646.
Official Action Dated Aug. 23, 2011 From the US Patent and Trademark Office Re.: U.S. Appl. No. 11/606,242.
Official Action Dated May 23, 2012 From the US Patent and Trademark Office Re. U.S. Appl. No. 11/606,242.
Official Action Dated Jan. 25, 2007 From the US Patenbtand Trademark Office Re.: U.S. Appl. No. 10/776,163.
Official Action Dated Feb. 26, 2009 From the United States Patent and Tademark Office Re.: U.S. Appl. No. 10/776,163.
Official Action Dated Jan. 26, 2010 From the US Patent and Trademark Office Re.: U.S. Appl. No. 90/009,646.
Official Action Dated Jul. 27, 2009 From the US Patent and Trademark Office Re.: U.S. Appl. No. 11/606,242.
Official Action Dated Jun. 30, 2006 From the US Patent and Trademark Office Re.: U.S. Appl. No. 10/776,163.
Official Action Dated Mar. 31, 2009 From the US Patent and Trademark Office Re.: U.S. Appl. No. 11/606,154.
Official Action Dated Mar. 31, 2010 From the US Patent and Trademark Office Re.: U.S. Appl. No. 11/606,242.
Oficial Action Dated Feb. 12, 2008 From the US Patent and Trademark Office Re.: U.S. Appl. No. 10/776,163.
Response Dated Sep. 1, 2011 to Notice of Reason for Rejection of Jun. 17, 2011 From the Japanese Patent Office Re. Application No. 2007-514324.
Response Dated Aug. 2, 2010 to Official Action Dated Mar. 31, 2010 From the US Patent and Trademark Office Re.: U.S. Appl. No. 11/606,242.
Response Dated Apr. 4, 2011 to Office Action of Dec. 7, 2010 From the Israel Patent Office Re. Application No. 179765.
Response Dated Jun. 7, 2011 to Official Action of Feb. 8, 2011 From the US Patent and Trademark Office Re.: U.S. Appl. No. 11/606,242.
Response Dated Dec. 8, 2011 to Official Action of Aug. 23, 2011 From the US Patent and Trademark Office Re.: U.S. Appl. No. 11/606,242.
Response Dated Dec. 10, 2009 to Office Action of Aug. 26, 2009 From the Israel Patent Office Re.: Application No. 177323.
Response Dated Mar. 10, 2010 to Communication Pursuant to Article 94(3) EPC of Nov. 12, 2009 From the European Patent Office Re.: Application No. 05703208.8.
Response Dated Jul. 11, 2011 to Office Action of Mar. 24, 2011 From the Israeli Patent Office Re.: Application No. 177323.
Response Dated Jun. 16, 2010 to Official Action of Apr. 22, 2010 From the US Patent and Trademark Office Re.: U.S. Appl. No. 90/009,646.
Response Dated Jan. 19, 2011 to Official Action of Dec. 6, 2010 From the US Patent and Trademark Office Re.: U.S. Appl. No. 10/589,234.
Response Dated Jun. 22, 2010 to Official Action of Apr. 22, 2010 From the US Patent and Trademark Office Re.: U.S. Appl. No. 90/009,646.
Response Dated Dec. 28, 2009 to Official Action of Jul. 27, 2009 From the US Patent and Trademark Office Re.: U.S. Appl. No. 11/606,242.
Response Dated Nov. 28, 2010 to Office Action of Jul. 28, 2010 From the Israeli Patent Office Re.: Application No. 177323.
Response Dated Oct. 28, 2010 to Official Action of Sep. 7, 2010 From the US Patent and Trademark Office Re.: U.S. Appl. No. 10/589,234.
Supplementary European Search Report Dated Aug. 26, 2009 From the European Patent Office Re.: Application No. 05703208.8.
Supplementary European Search Report Dated Jun. 29, 2009 From the European Patent Office Re.: Application No. 05744201.4.
Supplementary Response Dated Jul. 21, 2011 to Response of Jul. 11, 2011 to Office Action of Mar. 24, 2011 From the Israeli Patent Office Re.: Application No. 177323.
Third Party Request for Ex Parte Reexamination Dated Nov. 30, 2009 From the US Patent and Trademark Office Re.: Patent No. 7,134,749.
Translation of Notice of Reason for Rejection Dated Jun. 17, 2011 From the Japanese Patent Office Re. Application No. 2007-514324.
Translation of Notice of Reason for Rejection Dated Nov. 18, 2011 From the Japanese Patent Office Re. Application No. 2007-514324.
Translation of Notice of Reason for Rejection Dated Sep. 28, 2010 From the Japanese Patent Office Re. Application No. 2006-552776.
Written Opinion Dated Jan. 4, 2006 From the International Searching Authority Re.: Application No. PCT/IL05/00559.
Written Opinion Dated Jan. 9, 2007 From the International Searching Authority Re.: Application No. PCT/IL05/00166.
Written Opinion Dated Sep. 19, 2006 From the International Searching Authority Re.: Application No. PCT/IL0500558.
Wikipedia "Boehmite", Wikipedia, the Free Encyclopedia, Retrieved From the Internet, Dec. 11, 2007.
Acknowlegment of Request for Notice of Allowance Dated Jun. 18, 2013 From the US Patent and Trademark Office Re. U.S. Appl. No. 12/853,389.
Official Action Dated May 14, 2012 From the US Patent and Trademark Office Re. U.S. Appl. No. 12/853,361.

(56) References Cited

OTHER PUBLICATIONS

Official Action Dated Dec. 20, 2012 From the US Patent and Trademark Office Re. U.S. Appl. No. 12/853,389.
International Preliminary Report on Patentability Dated Feb. 23, 2012 From the International Bureau of WIPO Re. Application No. PCT/IL2010/000645.
Official Action Dated Jun. 18, 2013 From the US Patent and Trademark Office Re. U.S. Appl. No. 12/853,361.
Notice of Allowance Dated Jun. 28, 2012 From the US Patent and Trademark Office Re. U.S. Appl. No. 12/853,369.
International Search Report and the Written Opinion Dated Dec. 21, 2010 From the International Searching Authority Re. Application No. PCT/IL2010/000645.
Kessel et al. "The Diacetone Acrylamide Crosslinking Reaction and Its Influence on the Film Formation of an Acrylic Latex", Journal of Coatings Technology and Research, 5(3): 285-297, Sep. 2008.
Official Action Dated Nov. 30, 2012 From the US Patent and Trademark Office Re. U.S. Appl. No. 11/606,242.
Restriction Official Action Dated Apr. 3, 2012 From the US Patent and Trademark Office Re. U.S. Appl. No. 12/853,361.
Official Action Dated Jan. 15, 2013 From the US Patent and Trademark Office Re. U.S. Appl. No. 12/853,361.
Official Action Dated Mar. 12, 2012 From the US Patent and Trademark Office Re. U.S. Appl. No. 12/853,369.
Official Action Dated Nov. 15, 2013 From the US Patent and Trademark Office Re. U.S. Appl. No. 12/853,361.
Applicant-Initiated Interview Summary Dated Oct. 9, 2013 From the US Patent and Trademark Office Re. U.S. Appl. No. 12/853,361.
Corrected Notice of Allowability Dated Aug. 19, 2013 From the US Patent and Trademark Office Re. U.S. Appl. No. 12/853,389.
Translation of Notification of Office Action Dated Jul. 29, 2013 From the State Intellectual Property Office of the People's Republic of China Re. Application No. 201080045541.6.
Translation of Search Report Dated Jul. 29, 2013 From the State Intellectual Property Office of the People's Republic of China Re. Application No. 201080045541.6.
Official Action Dated Jul. 12, 2013 From the US Patent and Trademark Office Re. U.S. Appl. No. 11/606,242.
Applicant-Initiated Interview Summary Dated Feb. 13, 2014 From the US Patent and Trademark Office Re. U.S. Appl. No. 11/606,242.
Official Action Dated Jun. 11, 2014 From the US Patent and Trademark Office Re. U.S. Appl. No. 12/853,361.
Communication Pursuant to Article 94(3) EPC Dated Oct. 10, 2014 From the European Patent Office Re. Application No. 10754998.2.
Official Action Dated Jul. 18, 2014 From the US Patent and Trademark Office Re. U.S. Appl. No. 11/606,242.

* cited by examiner

FORMALDEHYDE-FREE INKJET COMPOSITIONS AND PROCESSES

RELATED APPLICATION

This application claims the benefit of priority under 35 USC 119(e) of U.S. Provisional Patent Application No. 61/372,123, filed Aug. 10, 2010, the contents of which are incorporated herein by reference in their entirety.

FIELD AND BACKGROUND OF THE INVENTION

The present invention, in some embodiments thereof, relates to inkjet printing techniques and, more particularly, but not exclusively, to improved processes and compositions for formaldehyde-free inkjet printing of high resolution color images on absorptive and non-absorptive substrates of all colors.

The ever growing market of printing complex designs and images on almost every type of surface, and especially on knitted, woven and non-woven textile surfaces, plasticized and laminated fabrics (soft signage) and the likes, creates demands for new and more versatile printing technologies and materials. One such demand is for ink compositions and technologies which will be suitable for printing long lasting, durable, abrasion resistant, water-, detergent- and chemical-fast color images on a variety of materials, which will not wear out rapidly upon use, handling, washing and exposure to the environment. The garment industry is possibly the most demanding in terms of printing high quality and durable prints of textile, adding some requirements from the product, such as pleasant hand-feel of the printed area, flexible (bendable without cracking), stretchable and aerated print area, as well as fulfilling the requirement of Oeko-Tex Standard 100 (an international testing and certification system for textiles, limiting the use of certain chemicals, which was developed in 1992).

One of the most advanced techniques for achieving high-end printing results on fabrics and other pliable and absorptive surfaces is using polymerizable inkjet compositions by inkjet printing machines. Polymerizable ink compositions typically comprise a colorant dispersed in a polymerizable dispersant, mostly acrylic and urethane. These polymerizable ink compositions are generally applied on the substrate and then undergo curing to form a film, constituting the printed design or image. The film should be durable and affixed firmly to the substrate if long-lasting product is desired. Good film affixation to the substrate is typically afforded during the polymerization reaction (initiation, setting and curing) by use of crosslinking agents.

IL Patent No. 162231 and WO 2005/115089 by the present assignee, which are hereby incorporated by reference as if fully set forth herein, teach processes and systems for printing high quality, high resolution, multi-color images on fibrous or porous materials or other ink absorbing materials, or on materials having high surface tension with the ink liquid, and especially over garments, effected by applying a wetting composition prior to applying an ink composition and formation of the images. Specifically, the process of printing an image on a surface is effected by contacting at least a part of the surface, preferably covering slightly more than the area which is intended for the image, with a wetting composition so as to wet that part of the surface. The wetting composition is capable of interfering with the engagement of a liquid ink composition with material, such that when applying the liquid ink composition on the wetted surface, the ink is kept from smearing and absorbing in the material, allowing to form a high-quality image on the wet part of the absorptive surface. According to some embodiments disclosed in IL Patent No. 162231 and WO 2005/115089, the wetting solution is applied in a way so as to soak the textile media therewith.

U.S. Pat. No. 7,134,749 by the present assignee, which is hereby incorporated by reference as if fully set forth herein, teaches a method and apparatus for color printing on a dark textile piece. According to the teachings of this patent, the method includes the steps of digitally applying a white opaque ink layer directly onto a dark textile piece, and digitally printing a colored image on the white ink layer. Specifically, the method for color printing on a dark textile piece is effected by digitally printing, by means of an inkjet printing head, an opaque white ink layer directly onto a dark textile piece; and digitally printing a colored image on the white ink layer. The digital printing of the white ink layer is performed such that the white ink layer substantially covers, without exceeding, the designed area of the colored image, and the area of the image that should be white, and further such that the white ink layer and the colored image are substantially coextensive.

IL Patent Application No. 162231 and WO 2005/15089, all by the present assignee and incorporated by reference as if fully set forth herein, teach a process for printing an image on a substrate, which is effected by wetting a surface onto which an image is to be printed with a wetting composition that interferes with the engagement of the liquid ink composition with the surface and thus temporarily modifies the surface mechanical, physical and/or chemical characteristics, and thus contributes to the immobilization of the jetted droplets of ink on the substrate by minimizing the available time for the solid-liquid interface interactions which leads, for example, to absorption by wicking, or free-flowing of ink on top of non-adsorptive substrates which leads, for example, to smearing and bleeding of the ink. This immobilization of the droplets, effected by the temporary augmentation of the surface tensions of the surface, affords an image by an inkjet printing process, which is well affixed on the substrate and durable while still being characterized by high-resolution, high-definition and vivid colors, with no excessive bleeding and diffusion of the ink into the substrate.

U.S. Patent Application Nos. 2007/0103528 and 2007/0104899 teach improved and integrated methodologies for printing high quality, high resolution, multi-color images on lightly and/or darkly colored fibrous or porous materials or other ink absorbing materials, by providing a mechanism for drop immobilization aimed at inhibiting the adsorption by fabric, the bleeding, smearing, paddling and feathering of the jetted ink droplets. These integrated processes are effected by digitally printing a layer of an opaque, lightly colored ink composition, followed by digitally printing the colored image thereon, and optionally further involve applying a wetting composition prior to and/or subsequent to printing of these layers. These documents further provide multi-component compositions and processes utilizing wetting compositions and/or two-part liquid ink compositions which can interact therebetween as property-adjusting and property-sensitive pairs, so as to effect a chemical and/or physical change in one or more of these parts, and thus obtain improved binding and color perception of the resulting images on surfaces, particularly in cases of absorptive substrates. The ink drop immobilization is effected by adding a property-adjusting agent to either the liquid ink compositions or to a wetting composition and adding a property-sensitive agent, which promotes the gelation of the emulsion and precipitation and subsequent immobilization of the colorant to the substrate upon contacting the property-adjusting agent, to any of the wetting or liquid ink compositions which does not have the property-adjusting, while the curing finish results in crosslinking and affixing the polymer and colorants in the ink to the material of the substrate on its surface. Thus, the ink composition presented in these publications is made up of at least two parts which combine in situ on the surface of the substrate: a colorless part that is applied in order to interact with the colored part of the ink, thereby achieving at least a temporary immobilization of the colored part and minimize its absorption onto the substrate prior to printing the image, and another part containing the colorant which is applied in order to afford the image.

U.S. Patent Application having Publication No. 2011/0032319, which is incorporated by reference as fully set forth herein, teach a process of flattening and smoothing a textile substrate in preparation for inkjet printing and a device to effect the process. The disclosed process comprises spraying a fabric-based substrate with, for example, simple tap water, and then scraping the wet surface with a squeegee or pressing it with a roller, thereby forming a temporary flat surface in terms of protruding fibers or weaving dimples which affords improved conditions for printing highly sharp images thereon.

U.S. Patent Application having Publication No. 2011/0032304, which is incorporated by reference as fully set forth herein, teach multi-part inkjet ink compositions and processes for inkjet printing a high resolution and vivid color images on absorptive and stretchable substrates, such as spandex Lycra™ garments of all colors. This document teaches the use of proto-elastomeric, low Tg polymerizable agents in the composition, that congeal on the substrate before the polymerization reaction commences, thereby preventing feathering and bleeding of the colors into the fabric, and then cure to a firmly affixed stretchable film.

As mentioned above, the ingredient of the inkjet ink composition which can promote the formation of a polymeric/co-polymeric film, as well as promote bonding and affixation of the film to the substrate, is the crosslinking agent. The growing awareness among consumers, workers and manufacturers, has pushed the consumer-products market in general and the polymer industries in particular to search for compositions and processes which minimize or altogether nullify the use of harmful ingredients and the production of harmful by-products. One such by-product is formaldehyde, which is a by-product emitted during the polymerization and curing process of polymers using conventional crosslinking agents, such as amino resins. Albeit these crosslinking agents are highly effective, they contain at least 0.1-2.5% formaldehyde, and further emit more formaldehyde during the crosslinking reaction.

These days, any textile ink containing formaldehyde is restricted for use in certain applications, based on formaldehyde content of the garment according to Öko-Tex Standard 100 (Oeko-Tex). Although formaldehyde, which forms upon use of amino resin crosslinking agents, may evaporate from the garment at high temperatures, the levels of formaldehyde can never reach the allowed values according to the widely accepted Öko-Tex Standard 100 and Öko-Tex Standard 1000. Presently many manufacturers in the garment and consumer product industries prefer to refrain from using ink compositions containing or emitting formaldehyde to protect their employees and customers from exposure to formaldehyde.

U.S. Patent Application Nos. 2007/0218222, 2009/0122127 and 2010/0075045 and U.S. Pat. No. 7,748,838 disclose the use of glyoxal, a dialdehyde, as a crosslinking agent in ink compositions; U.S. Patent Application No. 2008/0241436 discloses the use of carbodiimides as crosslinking agents in ink compositions; U.S. Pat. Nos. 5,596,047, 6,063,922 and 7,381,347 teach carbamate functional 1,3,5-triazines and other crosslinking agents; and U.S. Pat. No. 7,723,400 and Kessel, N. et al. [J. Coat. Technol. Res., 5 (3) 285-297, 2008] teach the use of diacetone acrylamide in the context of an inkjet ink composition.

Additional prior art documents include U.S. Pat. Nos. 7,425,062, 7,381,347, 7,119,160, 6,124,398, 6,063,922, 5,596,047, 5,360,933, 4,888,093, 4,345,063, 4,285,690, 4,284,758, 3,100,704, and EP 0277361A1.

SUMMARY OF THE INVENTION

The present inventors have now designed and successfully practiced processes for inkjet printing high-quality color images directly on various substrates, which afford objects that are essentially free of formaldehyde and are therefore especially suitable for use in the manufacturing of decorated garments and other decorated products for infants. The processes are also compliant with the regulations and standards of manufacturing in a formaldehyde-free environment. The processes involve the use of a wetting composition and a liquid ink composition which includes a colorant, a co-polymerizable agent and a formaldehyde-free crosslinking agent which promotes the adhesion of the colorant's matrix to the surface. The resulting image is printed on the part of the surface of the substrate which is wet with the wetting composition. The process presented herein is suitable for printing on absorptive and non-absorptive substrates of any color including non-white and/or highly stretchable substrates.

Thus, according to one aspect of embodiments of the present invention there is provided a process of direct inkjet printing an image on a surface of an object, the process comprising contacting at least a part of the surface with a wetting composition so as to provide a wet part of the surface; and inkjet printing a liquid ink composition on the wet part of the surface, so as to form the image on the part of the surface, the liquid ink composition includes a colorant, a formaldehyde-free crosslinking agent, a co-polymerizable agent and a carrier; thereby forming the image.

According to some embodiments, the process presented herein is substantially devoid of formaldehyde emission.

According to some embodiments, the object is a garment.

According to some embodiments, the object is intended for use by infants.

According to some embodiments, the formaldehyde-free crosslinking agent is selected from the group consisting of a carbodiimide, a heteroaryl polycarbamate, a diacetone acrylamide/hydrazine and a polyaldehyde.

According to some embodiments, the formaldehyde-free crosslinking agent is a carbodiimide.

According to some embodiments, the liquid ink composition comprises a single-part ink composition.

According to some embodiments, the liquid ink composition is a multi-part ink composition.

According to some embodiments, the multi-part ink composition includes a first part which includes a property-adjusting agent, and the second part which includes an emulsified property-sensitive agent, the formaldehyde-free crosslinking agent, the co-polymerizable agent and the colorant, whereas the second part congeals upon contact with the first part.

According to some embodiments, the multi-part ink composition further includes a third part which includes the emulsified property-sensitive agent, a dispersed metal oxide, the co-polymerizable agent and the formaldehyde-free crosslinking agent, whereas the third part congeals upon contact with the first part.

According to some embodiments, the metal oxide is substantially opaque white and selected from the group consisting of titanium dioxide, lead oxide, zinc oxide and molybdenum oxide.

According to some embodiments, the ink composition further includes a co-polymerizable binder, a polymerization catalyst, a buffering agent, a softener/plasticizer, a surface active agent, a surface tension modifying agent, a viscosity modifying agent, a thickener agent, an anticorrosion agent and any combination thereof.

According to some embodiments, the carrier is an aqueous carrier.

According to some embodiments, the process presented herein further includes, subsequent to the printing, curing the image.

According to another aspect of embodiments of the present invention, there is provided an object having an image printed thereon, the image is being printed by the process presented.

According to some embodiments, the formaldehyde level which can be detected in the object is equal or less than about 20 ppm.

As used herein the term "about" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the phrase "substantially devoid of" a certain substance refers to a composition that is totally devoid of this substance or includes no more than 0.1 weight percent of the substance.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The words "optionally" or "alternatively" are used herein to mean "is provided in some embodiments and not provided in other embodiments". Any particular embodiment of the invention may include a plurality of "optional" features unless such features conflict.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

It is expected that during the life of a patent maturing from this application many relevant methods, uses and compositions will be developed and the scope of the terms methods, uses, compositions and polymers are intended to include all such new technologies a priori.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF THE PREFERRED EMBODIMENTS

Figure 1:
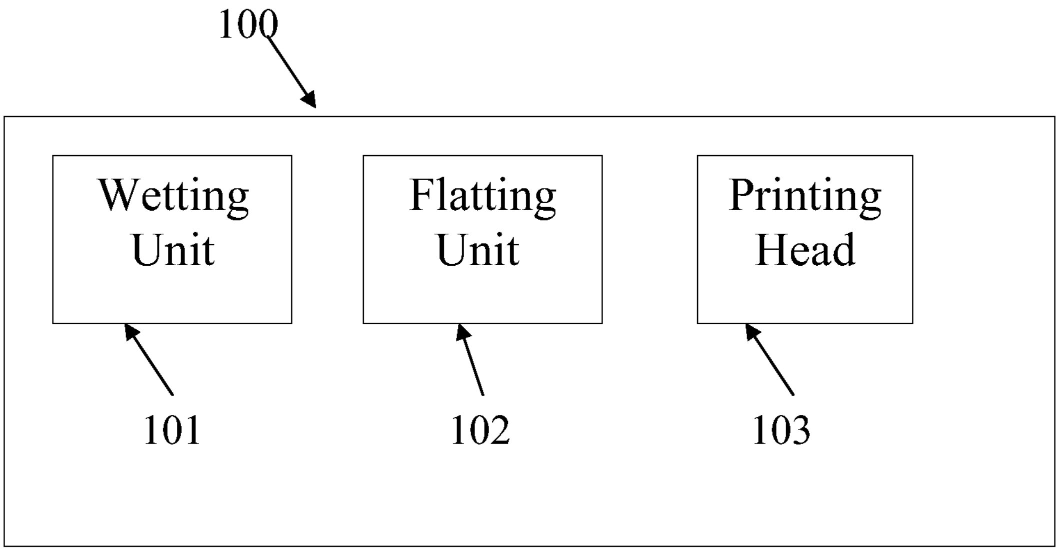
FIG. 1 presents a schematic diagram illustrating a digital printing machine with a wetting unit, a flattening unit and a printing head, according to a first embodiment of the present invention.

The present invention, in some embodiments thereof, relates to inkjet printing techniques and, more particularly, but not exclusively, to improved processes and compositions for formaldehyde-free inkjet printing of high resolution color images on absorptive and non-absorptive substrates of all colors.

The principles and operation of the present invention may be better understood with reference to the figures and accompanying descriptions.

Before explaining at least one embodiment of the invention in detail, it is to be understood that the invention is not necessarily limited in its application to the details set forth in the following description or exemplified by the Examples. The invention is capable of other embodiments or of being practiced or carried out in various ways.

As discussed in detail hereinabove, there is an ever-growing need for methods and compositions for improved performance of inkjet technologies, particularly on challenging substrates such as colored (non-white) and/or absorptive materials such as knitted, woven or unwoven textile and garments that are designed and expected to stretch and laundered regularly, as well as on non-woven fabrics, soft signage and other substrates and objects which are substantially non-absorptive materials which are designed to bend and flex.

This growing market demand has raised the awareness for health hazards that may stem from industrial chemicals which are used in the printing process, both from the end-user stand and from the manufacturing procedure considerations. Since formaldehyde, is used and/or emitted during and after many presently practiced inkjet printing processes, and since formaldehyde has been implicated as a health hazard, most of the presently practiced inkjet composition and processes were found unacceptable for producing consumer products for vulnerable humans such as infants and babies, or even unacceptable in terms of good manufacturing practices.

While searching for improved ingredients and formulations for inkjet compositions and printing processes, the present inventors have surprisingly found that water-immiscible heteroaryl polycarbamate-based crosslinking agents, which were designed for use in non-inkjet formulations, can be used successfully in an inkjet process if the inkjet ink composition formulation is adjusted suitably.

While reducing the present invention to practice, it was further surprisingly found that utilizing these crosslinking agents can afford improved results in terms of the final product, namely afford an image which is better affixed to the surface of the substrate, as compared to use of standard crosslinking agents. Since these crosslinking agents are formaldehyde-free, the products afforded from such crosslinking agents and the processes by which these products are manufactured, comply with the strictest standards for consumer products and good manufacturing practices.

While further reducing the present invention to practice, it was found that these formaldehyde-free crosslinking agents can be utilized successfully with printing methodologies that involve a wetting composition, such as, for example, those methodologies developed and practiced by the present assignee, and discussed herein.

Some improvements of color inkjet printing on textile have been previously disclosed by the present assignee, as discussed hereinabove, such as wetting the garment on-the-fly with a layer of a wetting composition before applying the layer(s) of colored inks thereon, and printing procedures that can be preceded by printing an opaque white layer on the garment so as to form a white background for the image which improves the light reflectance of the surface.

The present inventors have uncovered that the use of formaldehyde-free crosslinking agents can be implemented also in multi-component compositions which are designed to limit or abolish pre-drying or pre-curing absorption of the ink droplets as well as to provide solutions for printing color images of non-white substrates.

Formaldehyde-Free Printing Process:

According to an aspect of the present invention, there is provided a process of direct inkjet printing an image on a surface of an object. The process is effected by:

contacting at least a part of the surface of the substrate with a wetting composition so as to provide a wet part of the surface; and inkjet printing a liquid ink composition on the wet part of the surface, while it is still wet with the wetting composition, so as to form the image on that part of the surface, while the liquid ink composition includes a colorant, a formaldehyde-free crosslinking agent, a co-polymerizable agent and a carrier.

The term "surface", as used herein, refers to the exterior or upper boundary, the external part or layer or the outward appearance of a substrate. This term is also used to describe any area of a surface, including specific parts of the surface. According to embodiments of the present invention, the image can be printed on at least a portion of the surface, as required by the design of the image.

The term "colorant" as used herein describes a substance which imparts the desired color to the printed image. The colorant may be a pigment or a dye. Pigments are solid colorants with are typically suspended in the carrier of the ink composition as dispersed particles, whereby dyes are colorants which are dissolved in the carrier of the ink composition. Some dyes may be insoluble liquids which form emulsions with the carrier. A typical colorant in inkjet ink compositions is a dispersed pigment. A typical dispersing agent (dispersant) may be a co-polymerizable agent.

The ink composition, according to some embodiments of the present invention, includes a co-polymerizable agent, which is intended to form a matrix for the colorant upon polymerization and form a film on the surface of the substrate. The image, therefore, can be regarded as a thin polymeric film which is affixed to the surface of the substrate.

Hence, the term "co-polymerizable agent" as used herein, refers to a monomeric or oligomeric substance that can undergo polymerization reactions with similar substances.

As discussed hereinbelow, the co-polymerizable agent may serve the purpose of providing a polymeric matrix for the colorant once it is polymerized, or according to some embodiments of the present invention, it can also serve the purpose of dispersing the pigment colorant particles in the ink composition as well as forming the polymeric matrix thereof.

Non-limiting example of co-polymerizable agents that are suitable for use in the context of embodiments of the present invention include various monomers, oligomers and polymers and copolymers such as acrylic resins, polyurethane emulsions and resins, polyether resins, polyester resins, polyacrylate resins, polyvinyl chloride resins, polyvinyl acetate resins, polyvinyl butyral resins, aminosilicon resins and combinations thereof.

Formaldehyde-Free Crosslinking Agent:

The thin polymeric film which is formed as a result of the printing process is typically cured and affixed to the surface of the substrate as a result of a reaction between the polymeric colorant matrix material (e.g. the co-polymerizable agent) and a crosslinking agent.

As used herein, the phrase "crosslinking agent" refers to a substance that promotes or regulates intermolecular covalent, ionic, hydrophobic or other form of bonding between polymer chains, linking them together to create a network of chains which result in a more elastic and/or rigid structure.

Crosslinking agents, according to some embodiments of the present invention, constitute a family of monomeric, oligomeric or polymeric substances, which contain at least two reactive groups that can interact with respective groups present in the polymerizable constituents of the ink composition and/or the substrate. Exemplary such reactive groups include, but are not limited to, amine groups, carboxyl groups, hydroxyl groups, double bonds, and sulfhydryl groups. Crosslinking agents include homo-bifunctional crosslinking agents that have two identical reactive end groups, and hetero-bifunctional crosslinking agents which have two different reactive end groups. These two classes of crosslinking agents differ primarily in the chemical reaction which is used to effect the crosslinking step, wherein homo-bifunctional crosslinking agents will require a one step reaction, and hetero-bifunctional crosslinking agents may require two steps to effect the same. While homo-bifunctional crosslinking agents have the tendency to result in self-conjugation, polymerization, and intramolecular crosslinking, hetero-bifunctional agents allow more controlled two step reactions, which minimizes undesirable intramolecular cross reaction and polymerization. Crosslinking agents are further characterized by different spacer arm lengths between the two functional groups. A crosslinking agent with a longer spacer arm may be used where two target groups are further apart and when more flexibility is desired.

The type of bonding between the ink composition (the film) and the substrate depends substantially on the type of substrate, or more specifically, on the physical micro-structure of the surface, and the availability of reactive functional groups on the surface of the substrate, namely its chemical composition. Cellulosic materials, such as many fabrics made at least partially from natural fibers (cotton, hemp), wool, silk and even skin and leather, offer a variety of available and reactive functional groups such as hydroxyl, carboxyl, thiol and amine groups, which can be tethered to the film via the crosslinking agent. Alternatively, in cases of some substrates such as synthetic polymeric substrates, the scarcity of reactive functional groups means that the bonding of the film to the substrate is afforded by mechanical properties and micro-structure of the surface, namely affixation by polymeric adhesion and physical interweaving and entanglement.

The crosslinking agent also has an effect on the elasticity of the resulting co-polymerized ink composition. The resulting modification of mechanical properties of the polymeric film formed on the substrate, constituting the printed image, depends on the crosslink density, i.e., low crosslink densities raise the viscosities of semi-fluid polymers, intermediate crosslink densities transform gummy polymers into materials that have elastomeric properties and potentially high strengths, and highly crosslink densities can cause materials to become rigid, glassy and even brittle. The crosslink density of the cured polymer, which in the case of embodiments of the present invention constitutes the colorants-containing image (film), stems primarily from the concentration of the crosslinking agent in the pre-polymerization mixture, which in the case of embodiments of the present invention, constitutes the ink composition once applied on the substrate.

Hence, according to some embodiments of the present invention, the level of crosslink density of the cured ink composition is an intermediate level which affords a highly affixed yet pliable, stretchable and elastic film.

The type of crosslinking agent also influences the level of crosslink density, whereas the chemistry of the crosslinking reactions determines the strength and frequency (density) thereof. However, a more substantial factor that affects the choice of a crosslinking agent is its chemical mechanism of action and the type of by-products which are emitted during the polymerization, crosslinking and/or curing reactions.

While the majority of presently used crosslinking agents, such as amino resin crosslinking agents, are effective, they contain between 1000 ppm up to 25000 ppm formaldehyde, and further emit more formaldehyde during and/or after the crosslinking reaction.

These days, any textile ink containing formaldehyde is restricted for use in certain applications, based on formaldehyde content of the garment according to Öko-Tex Standard 100 (Oeko-Tex). Although formaldehyde, which forms upon use of amino resin crosslinking agents, may evaporate from the garment at high temperatures, the levels of formaldehyde can never reach the allowed values according to the widely accepted Öko-Tex Standard 1000.

Bound, blocked or lose formaldehyde used in textiles and other consumer products may slowly leak over time at a low rate. Hence, the process according to some embodiments of the present invention is essentially devoid of formaldehyde emission during and/or after its execution.

Thus, the phrase "formaldehyde-free crosslinking agent", as used herein, refers to a crosslinking agent which does not contain and/or emit formaldehyde during and/or after its use.

According to some embodiments of the present invention, the process presented herein and the products and printed objects afforded thereby comply with, for example, Öko-Tex Standard 1000, which is a specialized standard extending the more general Öko-Tex Standard 100 for limiting the use of certain chemicals. Compliance with Öko-Tex Standard 1000 is accomplished by passing chemical detection tests as set forth in certain standardization protocols, such as ISO protocols.

One of the widely accepted testing methodologies for formaldehyde in textile products is set forth in the "ISO 14184-1" or "ISO 17050-1" protocols, issued by the International Organization for Standardization. This method is used for determining free formaldehyde and formaldehyde extracted partly through hydrolysis (reaction with water) by means of a water extraction method. The method is intended for use in the range of free and/or hydrolyzed formaldehyde on the fabric between 20 ppm and 3500 ppm. Below 20 ppm the result is reported as "not detectable".

According to some embodiments of the present invention, the printed object afforded by the process is a garment, and according to other embodiments of the present invention, the object afforded by the process is acceptable for use by humans and particularly health-wise vulnerable humans such as infants and babies. For instance, it is required that no traces of formaldehyde are present on garments intended for use by babies.

According to embodiments of the present invention, the object afforded by the process resented herein is characterized by a detectable formaldehyde level which is equal or less than 100 ppm, 50 ppm or 20 ppm.

As presented hereinabove, one of the means for assessing compliance and acceptability of the printed objects, and monitoring the levels of formaldehyde emitted therefrom and/or during and/or after the process of manufacturing thereof are known in the art and include such detection methods provided in, for example, the standard test known as the "ISO 14184-1" or the "ISO 17050-1" standard tests.

According to some embodiments of the present invention, one family of formaldehyde-free crosslinking agents includes heteroaryl polycarbamate crosslinking agents which are based on a moiety derived from the group consisting of linear or cyclic ureas, substituted triazine, cyanuric acid, substituted cyanuric acid, linear or cyclic amides, glycolurils, hydantoins, linear or cyclic carbamates and mixtures thereof.

Exemplary formaldehyde-free crosslinking agents that belong to the heteroaryl polycarbamate family which were now found to be suitable in the context of formaldehyde-free crosslinker agents according to some embodiments of the present invention, are disclosed in the context of different utilities, for example, in U.S. Pat. Nos. 6,063,922, 5,596,047 and 7,381,347 and U.S. Patent Application No. 2004/0116558.

An exemplary heteroaryl polycarbamate, which is suitable in the context of formaldehyde-free crosslinker agents according to some embodiments of the present invention, can be represented by the general formula I:

Formula I

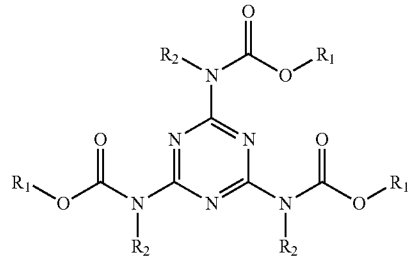

wherein each of the $R_1$ groups is independently a $C_{1-8}$ alkyl, and each of the $R_2$ groups is independently hydrogen or a $C_{1-8}$ alkyl.

A non-limiting example of such a formaldehyde-free crosslinking agent is CYLINK® 2000 by Cytec Industries, USA, wherein $R_1$ is methyl and/or n-butyl and $R_2$ is hydrogen.

Since most heteroaryl polycarbamate-based crosslinking agents exhibit limited solubility in water, an aqueous-based inkjet ink composition formulation which can be used in an inkjet process according to some embodiments of the present invention should be adjusted suitably. For example, certain alcohols, polyols and mixtures thereof can be used to assist in introducing a heteroaryl polycarbamate-based crosslinking agent into an aqueous-based inkjet ink composition as a solute or a dispersed species. Such substances are used regularly in inkjet compositions as humectants.

Humectants are typically used for avoiding nozzle blockage due to formation of a dried film as well as for adjusting surface tension and viscosity. These include, without limitation, polyethylene glycol and other polyalcohol mixtures. In the context of embodiments of the present invention, the humectants are present in considerable amounts, which can affect the solubility of other components on the various formulations.

While reducing the present invention to practice, it was found that some members of the heteroaryl polycarbamate formaldehyde-free crosslinking agents which exhibit limited solubility in water, may be introduced into the ink composition (any part thereof) if certain polar humectants are used in the composition. For example, when using the exemplary triazine-based having Formula I wherein $R_1$ is methyl and/or n-butyl and $R_2$ is hydrogen, it was found that a mixture of humectants which include butyl glycol (about 2-5%), monoethylene glycol (about 9-15%), glycerin (about 3-8%) and propylene glycol (about 15-25%), assists the dissolution of the crosslinking agent to a concentration of about 0.5% or higher. It is noted that adjusting the ink composition for this type of crosslinking agents is required since these agents are not designed specifically for use in inkjet ink compositions.

Another alternative family of formaldehyde-free crosslinking agents that are usable in the context of embodiments of the present invention includes dialdehydes, other polyaldehydes or dialdehyde acid analogues having at least one aldehyde group, such as, for example, $C_2$-$C_8$ dialdehydes. A widely used dialdehyde, which is used in diapers, is the shortest dialdehyde glyoxal. U.S. Pat. Nos. 4,285,690, 4,345,063 and 4,888,093 describe alkylated glyoxal/cyclic urea condensates that serve as crosslinkers for cellulosic fibers for high water retention pads. A non-limiting example of such crosslinking agents includes glyoxal.

Another alternative family of formaldehyde-free crosslinking agents that are usable in the context of embodiments of the present invention is based on diacetone acrylamide/hydrazine (polyalkenyl ether resins). These crosslinking agents, some of which are commercially available, are disclosed in, for example, in U.S. Pat. Nos. 5,348,997, 5,432,229 and 7,119,160, in the context of different processes. A non-limiting example of such crosslinking agents includes N-(1,1-dimethyl-3-oxobutyl)-acrylamide (DAAM)/hydrazine by Kyowa Hakko Chemical Co., Ltd., Japan.

Another alternative family of formaldehyde-free crosslinking agents that are usable in the context of embodiments of the present invention is based on carbodiimides. The term "carbodiimide" refers to the functional group having of the formula $-[N{=}C{=}N]_n-$ which can react readily with amine and carboxyl groups. Carbodiimide crosslinking agents are disclosed in, for example, in Japanese Patent Application No. 187029/1984, U.S. Patent Application No. 2007/0148128, U.S. Pat. Nos. 5,360,933, 6,124,398 and 7,425,062 and EP0277361, in the context of different processes. A non-limiting example of such crosslinking agents includes CARBODILITE® by Nashinbo, Japan.

The colorant, co-polymerizable agent and a formaldehyde-free crosslinking agent of the aforementioned ink composition are dissolved or suspended/dispersed in a carrier which gives rise to the liquid form of the ink composition. The carrier, according to some embodiments of the present invention, is an aqueous carrier; however other non-aqueous carriers are also contemplated in the context of other embodiments of the present invention.

Wetting Composition:

As discussed hereinabove, the process is effected by wetting at least a part of the surface with a wetting composition; and thereafter applying the liquid ink composition on the wet part of the surface while it is still wet from the wetting composition, so as to form an image thereon.

The wetting composition is applied on the surface prior to the ink composition so as to reduce or inhibit the absorption, spreading, smearing, or otherwise dislocating and deforming the small droplets of the ink composition from their original location and shape once jetted onto the surface. This is effected by the wetting composition by temporarily modifying the mechanical and/or chemical properties of the surface by, for example, reducing the contact area between the ink composition and the surface by, e.g., filling the grooves and pores in the surface or flattening perturbing objects such as fibers; temporarily modifying a physical property of the surface by, for example, reducing the surface tension formed between the surface and the ink composition; and temporarily modifying a chemical property of the surface by, for example, engaging the binding sites of the surface by, e.g., interacting with functional groups on the surface, masking, neutralizing or inverting the charge of functional groups on the surface.

Hence, it is said that the wetting composition is selected capable of temporarily interfere with the engagement of the liquid ink composition with at least one binding site of the surface. As used herein the phrase "binding site" describes any site of the surface that may interact, either chemically, mechanically or physically, with the ink composition. These include, for example, functional groups on the surface that may chemically bind compatible functional groups present in the ink composition; functional groups on the surface that may form hydrophobic or hydrophilic interactions with compatible functional groups present in the ink composition; flattening perturbing objects such as stray fibers that can interfere with the uniform application of the ink composition on the surface; any dry area of the surface which may thermodynamically promote absorption of the liquid ink composition; and any area of the surface which due to too high or too low surface tension promotes minimization or maximization of surface area of the ink droplets on the surface.

Applying the liquid ink composition can be effected by direct spraying or by any of the printing techniques known in the art, including, but not limited to, inkjet printing. According to some embodiments of the present invention, contacting the surface with the wetting composition is effected by spraying, ejecting or dripping the wetting composition onto the desired part of the surface, by means of a liquid applicator or nozzle. These methods are most suitable for a controlled and automatic in-line wetting procedure, and can therefore be readily implemented as a part of many mechanized printing techniques.

As used herein, the phrase "at least a part of the surface" describes one or more areas of the surface, and includes also the entire surface. Preferably the part of the surface that is contacted with the wetting composition includes the area onto which the ink is later on applied, namely, the total area covered by the printed image. The areas may be continuous or discontinuous.

Applying a sufficient amount of the wetting composition on the surface determines the effectiveness of the wetting process and the quality of the resulting image. The amount of the wetting composition applied on the surface during the contacting described above can be controlled by the liquid applicator mechanism. A suitable amount would be an amount which ensures uniform and adequate coverage of the surface with the wetting composition and further which ensures efficient modification of the surface physical characteristics regarding the engagement of the ink with the binding sites of the surface material. Yet, an excessive amount of the applied wetting composition may form a thick layer thereof, which may minimize the interaction of the ink and the surface and thus adversely affect the durability of the resulting image.

Preferably, contacting the surface with the wetting composition is performed so as to obtain a wet part of the surface in which the density of the wetting composition ranges from about 0.01 gram per 1 $cm^2$ of the surface to about 2 grams per 1 $cm^2$ of the surface, more preferably from about 0.05 gram per 1 $cm^2$ to about 1 gram per 1 $cm^2$, more preferably from about 0.1 gram per 1 $cm^2$ to about 1 gram per 1 $cm^2$ and, more preferably, from about 0.2 grams per 1 $cm^2$ to about 0.6 grams per 1 $cm^2$.

According to some embodiments of the present invention, the wetting composition is an aqueous-based wetting composition; however, other non-aqueous wetting compositions are contemplated, as exemplified hereinbelow.

According to some embodiments of the present invention, the wetting composition comprises water as a major component and further includes one or more organic solvents as described hereinabove.

According to some embodiments the wetting composition comprises organic solvent such as an alcohol as a major component (e.g., more than 90%). Such an exemplary wetting composition is selected so as to be compatible, in terms of miscibility, surface-tension and other criteria, with the use of an aqueous-based liquid ink composition and certain substrates, as these embodiments are presented and discussed herein.

The wetting composition according to some embodiments of the present invention may optionally further include one or more agents which may additionally alter the interaction of the ink composition with the surface during the process or thereafter, as a cured polymeric film. These agents include, for example, one or more adhesion promoting agents or binders, which are essentially co-polymeric agents, as described hereinabove. Such agents in the wetting composition temporarily alter the properties of the surface during the application of the ink composition, and thereafter participate in the co-polymerization and crosslinking reactions which form the image film.

Additional agents that may be beneficially incorporated in the wetting of the present invention include, for example, a formaldehyde-free crosslinking agent which will crosslink to polymerizable agents in the ink composition, a polymerization initiator/catalyst, one or more of viscosity modifying agents, thickening agents, surface tension modifying agents, surface active agents, surfactants, softeners and combinations thereof. The addition of such agents to the wetting composition may improve the effect of the wetting composition and may further provide a selected wetting composition with desirable characteristics.

Representative examples of agents that can be beneficially added to the wetting composition of the present invention include, without limitation, clays, polysaccharides, polyols such as propylene glycol and glycerin, modified siloxanes and polyalkylsiloxanes, aldehyde based liquid resins such as melamines, urea formaldehyde, phtalates, isocyanates, polymers and oligomers having hydroxyl, carboxyl or amide functional groups and catalysts, and thermally activated agents such as peroxides, epoxides, isocyanates and acrylates.

Mechanical Flattening:

In order to improve the smoothness of the wetted substrate's surface, and particularly substrates having protruding fibers as an intrinsic feature of their substance and making, a mechanical device such as a squeegee, "air knife" or any other form of a flat strip-shaped, blade-shaped or roller-shaped mechanical object may be passed across the wetted surface so that apply pressure on the wetted substrate, thereby flattening these fibers and other protruding features therein that may cause uneven capturing of the ink droplets.

U.S. Patent Application having Publication No. 2011/0032319, which is incorporated by reference as fully set forth herein, teaches a digital printing machine for printing textiles, such as fabric woven within a plane and comprising fibers extending outwardly from that plane. The machine according to this application, includes a wetting unit for wetting the fabric to be printed prior to the digital inkjet printing, a printing head for inkjet printing on the substrate, and a flattening unit for exerting pressure on the surface of the substrate in order to flatten any outwardly extending (protruding) fibers to the surface after wetting and before printing. This flattening device and action thereby causes the protruding fibers to stick to the surface of the substrate and to no-longer protrude, and thereby smoothing the substrate for inkjet printing.

Using the aforementioned fiber-flattening device can be effected by spraying and wetting the substrate with plain tap water as a wetting composition, or any other wetting composition, as disclosed therein. Tap water leave no stains or cause no color migration, leaching or fading, and hence can be used in some relative excess with respect to the parts of the multi-part ink composition provided herein. The application of the water need not be accurate with respect to the area covered by the image and can exceed it if necessary.

Reference is now made to FIG. 1 which is a schematic diagram illustrating a digital printing machine with a flattening unit according to embodiments of the present invention.

According to embodiments of the present invention, there is provided a digital printing machine 100 for printing textiles. The textiles may comprise garments or other textile items made of fabric knitted and/or woven within a plane, the fabric itself comprising fibers extending outwardly from the plain. The fabric may be based on any conventional or unconventional textile material. The fabric may for example comprise felt, leather, fibrous materials, porous materials, materials having high surface tension with the ink liquid, weaves of natural and synthetic fibers, weaves of mixtures of natural and synthetic fibers, natural fibers including wool, cotton, linen and synthetic fibers including nylon or suede. The fabric is essentially planar with smaller fibers, hairs, extending outwardly from the plane. The machine comprises a wetting unit 101 for wetting an item to be printed prior to printing. Wetting is performed for ink drop immobilization, thus limiting the penetration of the ink into the depth of the fabric, which may cause dull coloring of the garment, mixing of colors and blurring.

A printing head 103 prints on the item to be printed. A printing head comprises at least one inkjet nozzle (not shown). The printing head can be any conventional printing head, such as those marketed by Spectra, Inc., New Hampshire, USA, and others known in the industry.

When using conventional ink-jet type printing on textile without the use of the present embodiments, the outwardly extending fibers intercept the drops from the nozzle before they arrive at their intended destinations, as discussed above.

Pressing or flattening unit 102 may be located between wetting unit 101 and printing head 103, though other locations are possible. Pressing or flattening unit 102 exerts mechanical pressure on the item to be printed to flatten the outwardly extending fibers to the fabric after wetting and before printing. Flattening unit 102 may employ static pressure. Flattening unit 102 may be disengaged from the item to be printed (not shown) after flattening has been completed. The pressure of flattening unit 102 on the fabric, after wetting and before printing, causes the extending fibers or hairs to bend back towards the fabric before printing. The water from the wetting unit provides the fabric and the fibers with enough liquid to keep the outwardly extending fibers to temporarily remain stuck to the fabric. The fibers sticking to the fabric render the fabric as a smoother surface for printing without any interference of outwardly extending fibers.

Flattening unit 102 may be any construction that mechanically presses the fibers to the fabric as the fabric passes the unit. Flattening unit 102 may be implemented using for example a downwardly pressing curtain such as a PVC curtain, a mechanical roller such as a metal or polymeric roller, an Air knife, a squeegee, including for example a polymeric squeegee such as PVC or Natural or artificial rubber, silicon and, a thin flexible metal squeegee, a brushing strip and the like. Flattening unit 102 may replace the ironing unit (not shown), since there may be no need to iron the fabric. Flattening unit 102 may be adjusted before flattening for achieving a desired level of pressure. For example, different types of fabric or different levels of wetting may require different levels of pressure. Such pressure adjustment may be performed by using a counter balance (not shown), adjustable mechanical spring (not shown) or by pneumatic pressure adjustment (not shown).

The item to be printed (not shown) may be a garment or any other fabric, such as leather or suede.

Printing head 103 comprises an array of inkjet nozzles for performing digital printing. The inkjet nozzles may comprise a drop-on-demand piezoelectric inkjet nozzle or a continuous piezoelectric inkjet nozzle. Additional heads may provide post-printing and may comprise, a curing unit for curing ink, an ironing unit for ironing the item to be printed, or a heat press. The curing unit may be an infrared curing unit, a hot air blowing curing unit or a microwave-curing unit. Printing machine 100 may comprise an external head for stencil printing.

Printing machine 100 may comprise a printing table (not shown) for holding the items to be printed. Printing machine 100 may be a carousel, a matrix, or any other printing machine, as will be discussed in greater detail below.

Machine 100 may comprise additional printing heads and/or additional flatting units and/or additional wetting units.

Machine 100 may comprise a controller for coordinating relative motion between the table assembly (not shown) and the flattening unit 102.

Figure 2A:
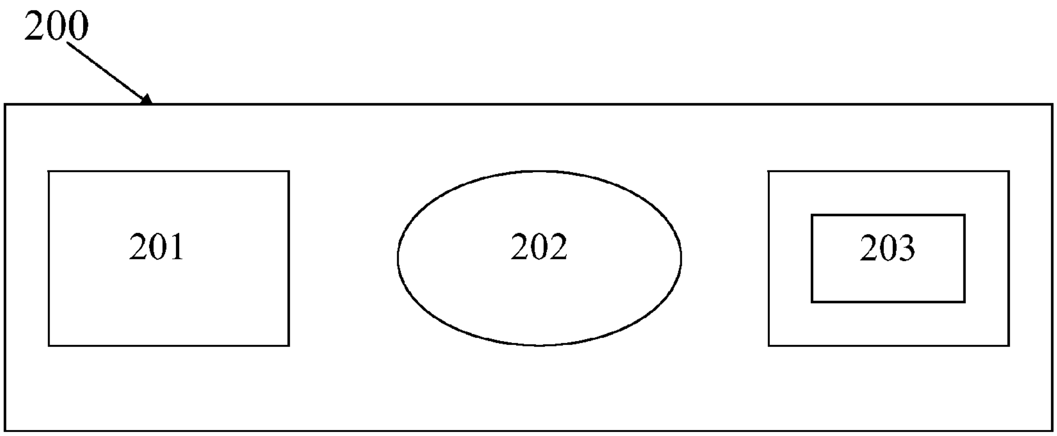
FIG. 2A-B present schematic diagrams of an exemplary printing machine with a roller-flattening unit according to a further embodiment of the present invention (FIG. 2A), and an exemplary printing machine with a curtain-flattening unit, according to a further embodiment of the present invention (FIG. 2B)

FIG. 2A is a schematic diagram of an exemplary printing machine with a roller-flattening unit. Printing machine 200 comprises a wetting unit 201, a flattening unit 202, and a printing head 203. Flattening unit 202, according to the exemplary diagram, is a roller, which is capable of exerting pressure on the item to be printed to flatten outwardly extending fibers to the fabric after wetting and before printing. In the exemplary diagram, the flattening unit is located before the printing head and after the wetting unit, though the units may be arranged in a different order.

Figure 2B:
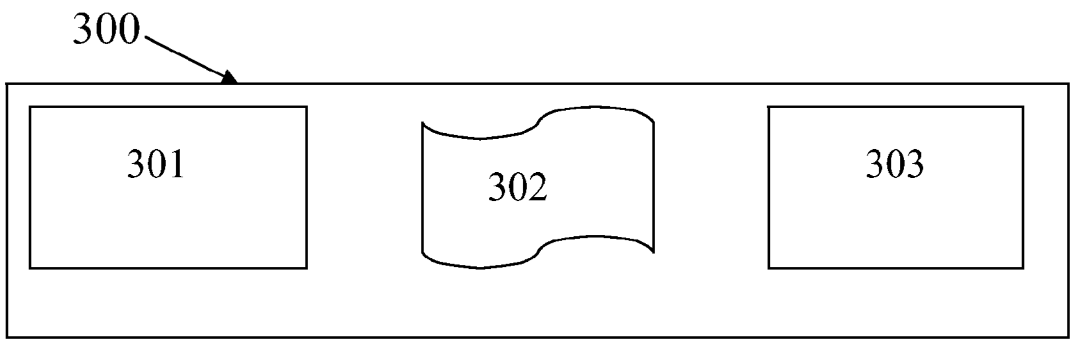

FIG. 2B is a schematic diagram of an exemplary printing machine with a polymeric or metal curtain-flattening unit. Digital printing machine 300 comprises a wetting unit 301, a flattening unit 302 and a printing head 303. Flattening unit 302 comprises a polymeric, silicone, polyethylene or metal curtain, which mechanically pushes downward on passing fabrics, thus exerting mechanical pressure on the item to be printed to flatten outwardly extending fibers to the fabric after wetting and before printing. In the exemplary diagram, the flattening unit is located before the printing head and after the wetting unit, though the units may be arranged in a different order.

Figure 3:
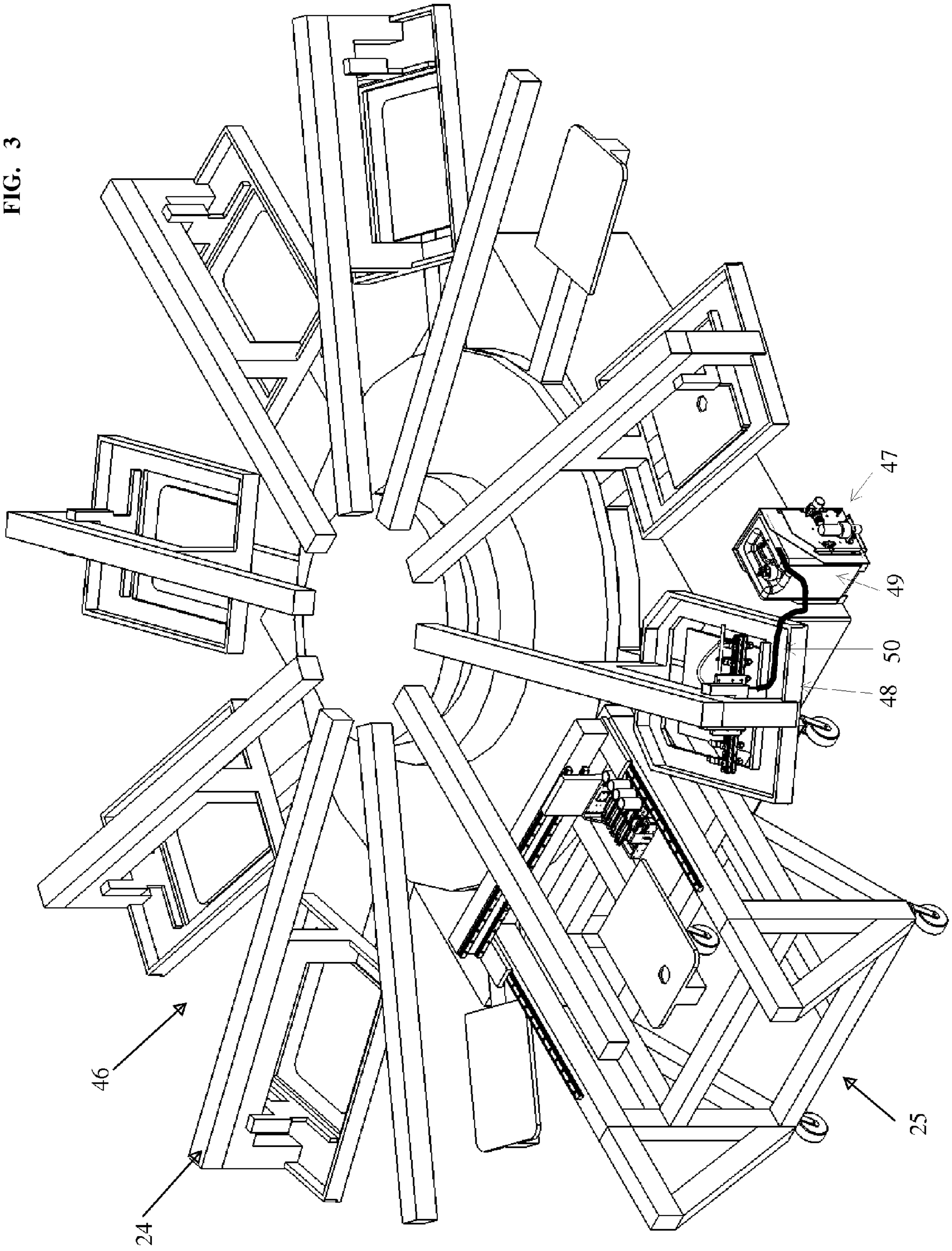
FIG. 3 presents a schematic diagram of an exemplary carousel-printing machine using a flattening unit according to an embodiment of the present invention.

Reference is now made to FIG. 3, which is a schematic diagram of a carousel-printing machine 46 in which one of the stations 47 is a wetting and flattening unit which includes a flattening unit 50 according to an embodiment of the present invention. The garment printing apparatus 46 comprises other stations such as a stencil-printing station 24, and digital printing station 25. A combination of stencil printing and digital printing may be used for printing a background color on the garment before performing the digital printing.

The wetting apparatus, which is part of digital printing station 47, comprises a wetting unit 48 comprising sprinklers and a tank part 49. The wetting unit may spray a wetting and immobilizing solution onto the textile or garment.

In use, a garment is placed on one of a series of printing trays, which go around the carousel and stop at stations as needed. At each station, the printing trays go through the process being offered at that station. In the case of wetting and flattening unit 47, the garment undergoes wetting, and then is flattened using flattening unit 50 and then the tray is moved onwards to digital printing station 25 for printing while still wet and with the fibers still adhering.

In an embodiment, for each printed garment, the stencil printing, if executed, is executed first, flash cured if required (not shown), then the wetting, then the flattening and then the digital printing. The execution of the stencil printing is optional and may be used for printing background colors or standard images.

The digital printing can be performed at any application stage, while following the digital unit a flash cure unit may be used to dry the digitally printed image.

Figure 4:
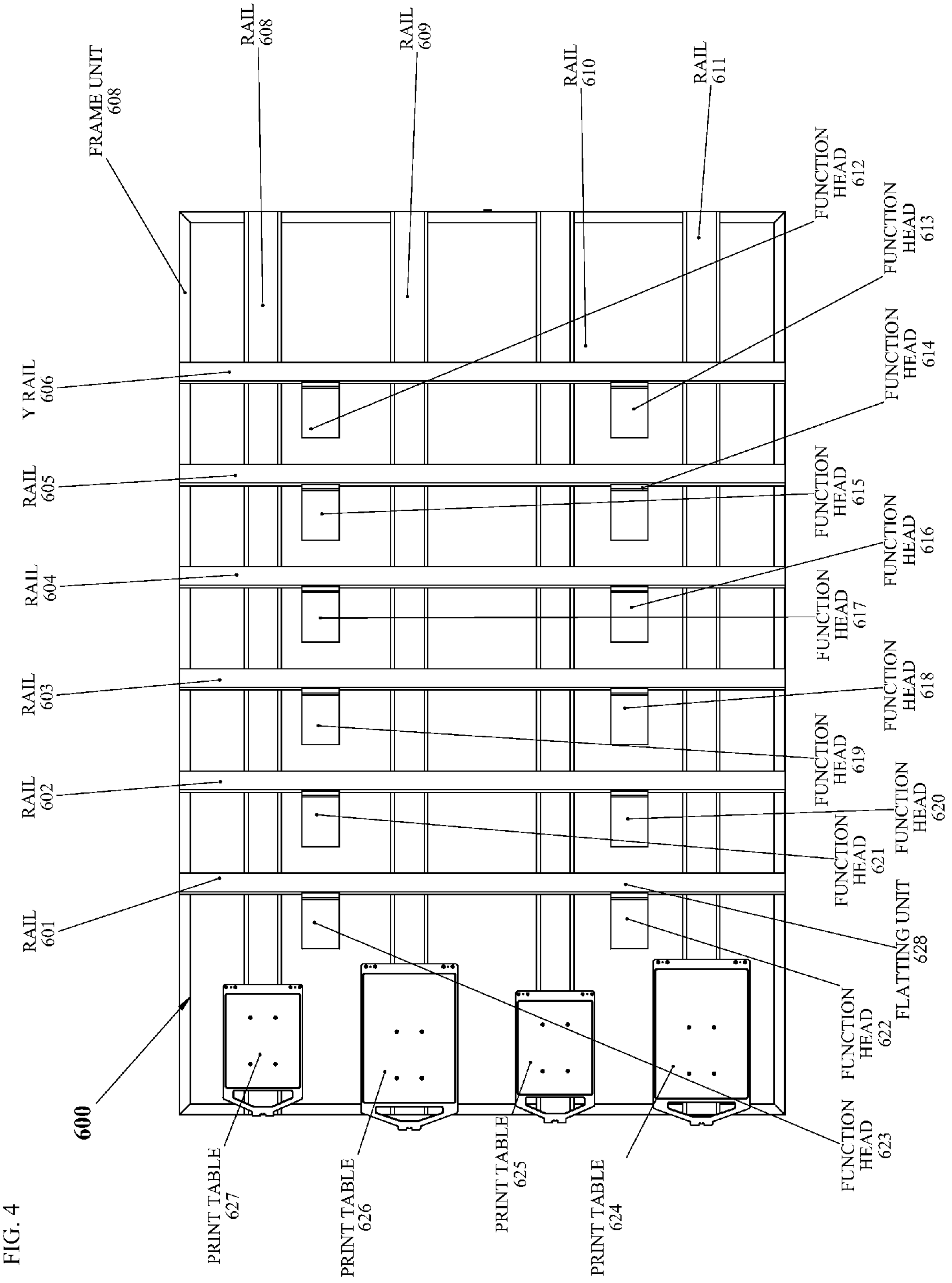
FIG. 4 presents a schematic diagram of an exemplary matrix-printing machine using a flattening unit, according to an embodiment of the present invention.

FIG. 4 is a schematic drawing of a matrix-printing machine using a flattening unit, according to an embodiment of the present invention Matrix 600 is a matrix of printing stations set out in linear manner so that a garment is placed on a tray and passes down a row of stations to be treated with a series of pre-printing, printing and post-printing functions. The matrix 600 features rail 601 which bears function head 623 and function head 622, rail 602 which bears function head 621 and function head 620, rail 603 which bears function head 619 and function head 618, rail 604 which bears function head 617 and function head 616, rail 605 which bears function head 615 and function head 614 and rail 606 which bears function head 612 and function head 613. Matrix 600 also features rail 608 which bears printing table (tray) 627, rail 609 which bears printing table (tray) 626, rail 610 which bears printing table (tray) 625, and rail 611 which bears printing table (tray) 624.

In the exemplary diagram, function head 622 is a wetting head and function head 620 is a printing head. Flattening unit 628 is located between wetting head 622 and printing head 620 underneath rail 601. In alternative embodiments, the units may be arranged in a different order.

Printing table 624, in the exemplary diagram, is first fed under wetting unit 622 for wetting the garment and then is fed under flattening unit 628 while the garment is still wet, thereby causing the fibers to stick due to surface tension. The table then passes to printing head 620, where digital printing takes place.

In the matrix, unit 622 could alternatively be a screen-printing station, in which case the wetting and digital printing units would be moved one station further along.

Figure 5:
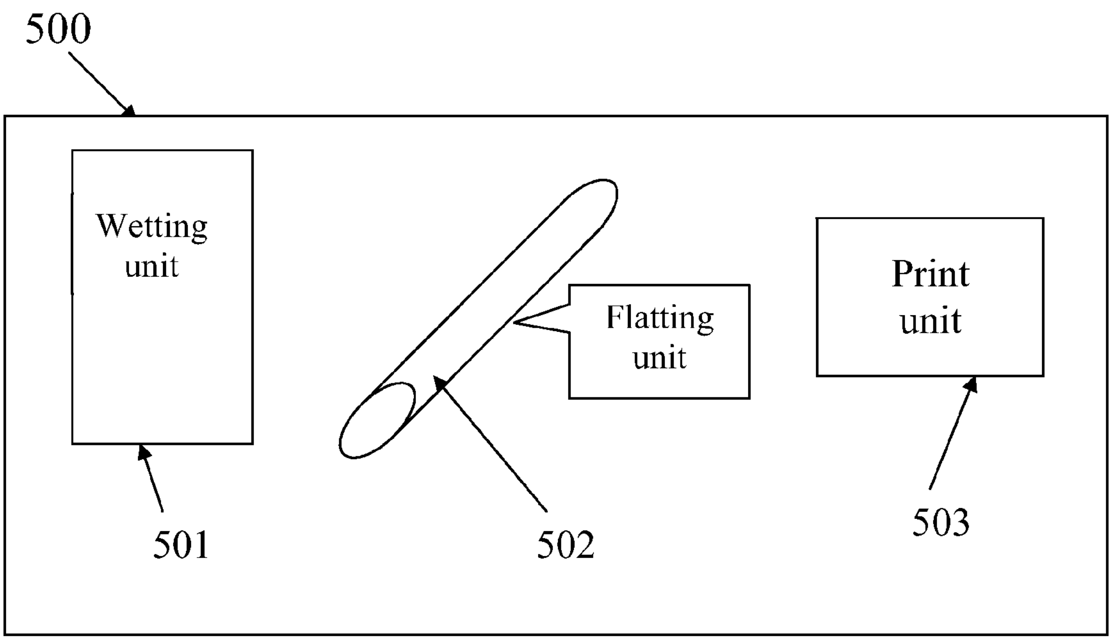
FIG. 5 presents a schematic diagram from the side, of a printing machine comprising a wetting unit, a roller type flattening unit and a printing unit.

Reference is now made to FIG. 5, which is a schematic diagram showing a view from the side of a textile-printing machine according to the present embodiments. Printing machine 500 comprises a wetting unit 501, a roller type flattening unit 502, and a printing head 503. A garment first passes the wetting unit 501, then is pressed when wet by the roller type flattening unit 502 and finally is printed under the printing unit 503, while the area being printed is still wet from the wetting unit and the fibers around the textile material still adhere to the underlying fabric.

Figure 6:
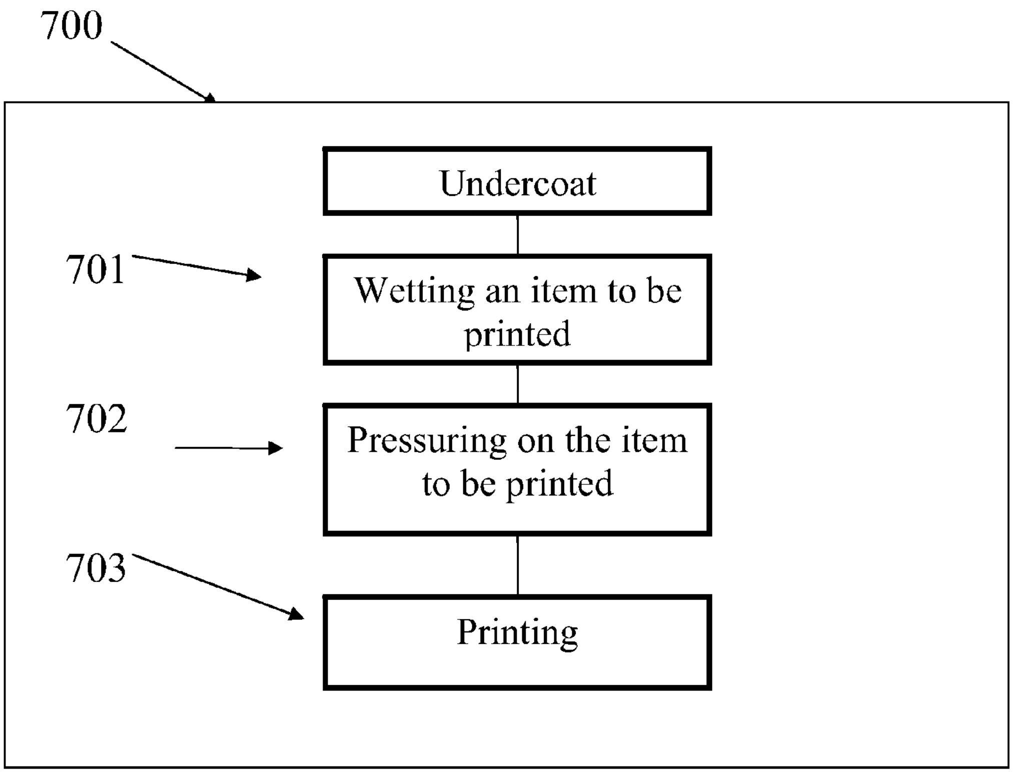
FIG. 6 presents a simplified flow chart describing an exemplary printing procedure for printing on a dark garment using a digital printing machine with a flattening unit according to an embodiment of the present invention.

FIG. 6 is a simplified flow chart illustrating an exemplary printing process for printing on a dark textile, using digital printing machine with a flattening unit according to the present embodiments.

As discussed above, when printing on a dark garment, a white undercoat may be printed on the garment prior to printing the image. In such a case, extensive wetting may be needed before printing the white undercoat. Thus, when printing an opaque layer, extensive wetting of the garment is performed before printing the white undercoat. Referring now to the drawing of FIG. 6, a process 700 of wetting, flattening and printing is shown which is suitable for dark colored backgrounds. In box 701, the garment is extensively wetted by a wetting unit in order to limit absorption of the ink by the fiber. In box 702, a flattening unit exerts pressure on the item to be printed in order to flatten outwardly extending fibers to the fabric after wetting and before printing. In box 703, the opaque undercoat is printed. In box 704, digital printing of the image on the wetted opaque layer is carried out by expelling drops of ink from nozzles of the printing head to desired points on the fabric, for example using the CMYK color system. Since the fibers of the fabric have been flattened and are clinging to the fabric surface, the fibers no longer intercept the ink drops and the drops thus land where intended on the fabric, leading to sharper printing.

Figure 7:
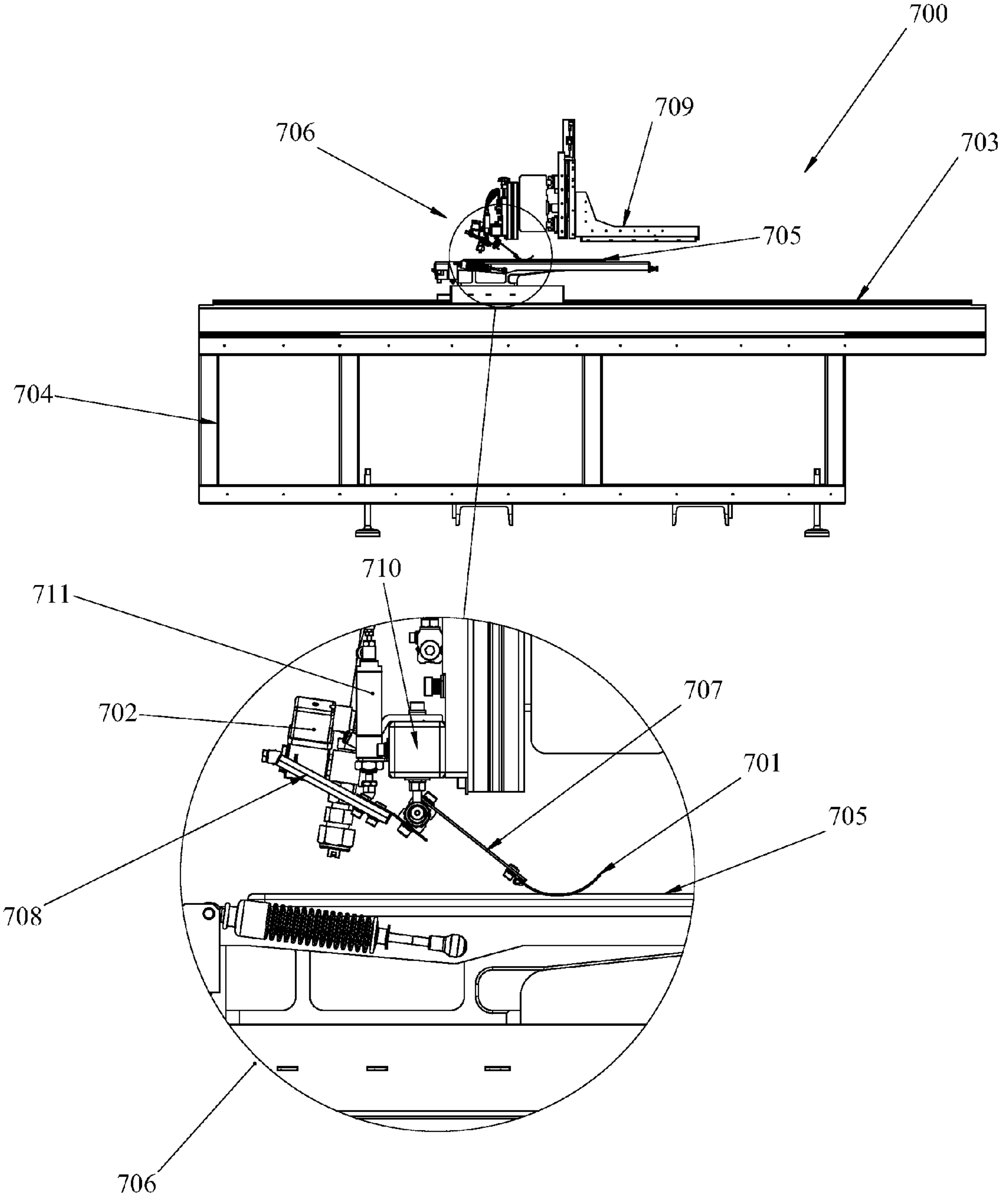
FIG. 7 presents a schematic side view of a digital printing machine comprising an exemplary flattening unit in operative state.

FIG. 7 is a schematic side view showing in greater detail an exemplary digital printing machine comprising an exemplary flattening unit in operative state. Digital printing machine 700 comprises chassis 704, scan axis 703 and flattening assembly 706. Scan axis 703 comprises a rail which is placed on chassis 704 and provides the rail for bearing tray 705. Tray 705 is used for holding an item to be printed (not shown). The enlargement 706 shows in greater detail the assembly of the flattening unit. The exemplary flattening assembly comprises rigid arm 707 which applies a constant pressure in the on state, elastic flattening unit 701 which may be made of rubber, wetting unit 702, as counterweight 708, which is here shown as a variable counterbalance to the weight applied by the rigid arm 707 to regulate the applied pressure, and the reversible attachment unit 711 that attaches or separates the flattening unit from the printing substrate.

Construction 710 holds the wetting spray units 702. Rigid arm 707 is attached to counterweight 708 which is here embodied as a variable counterbalance. Regulated counterbalance 708 imposes a required level of flattening pressure on flattening unit 701. Reversible attachment unit 711 comprises a piston that brings the flattening 701 squeegee into contact with the printing substrate and detaches it after flattening. Counterbalance 708 regulates the pressure on the flattening unit to press against tray 705 for flattening and detaches the flattening unit from tray 705 after flattening and before printing. Arm 707 of the flattening unit is hinged in order to allow pressure regulation unit 708 to regulate the weight applied to the garment. Attachment detachment unit 711 may transfer the pressure to the flattening unit when switched on. Adjusting the pressure on flattening unit 701 may be done for achieving a desired level of pressure. For example, different types of fabric or different levels of wetting may require different levels of pressure. Wetting unit 702 is used for wetting the item to be printed (not shown) before flattening. Wetting may be done, for example, by using water or acid solution optionally composed with wetting additive. Flattening unit 701 is shown in operative mode flattening the item to be printed (not shown) after wetting and before printing.

The item to be printed then passes under printing unit 709 to be printed while the fibers still adhere to the fabric.

Figure 8:
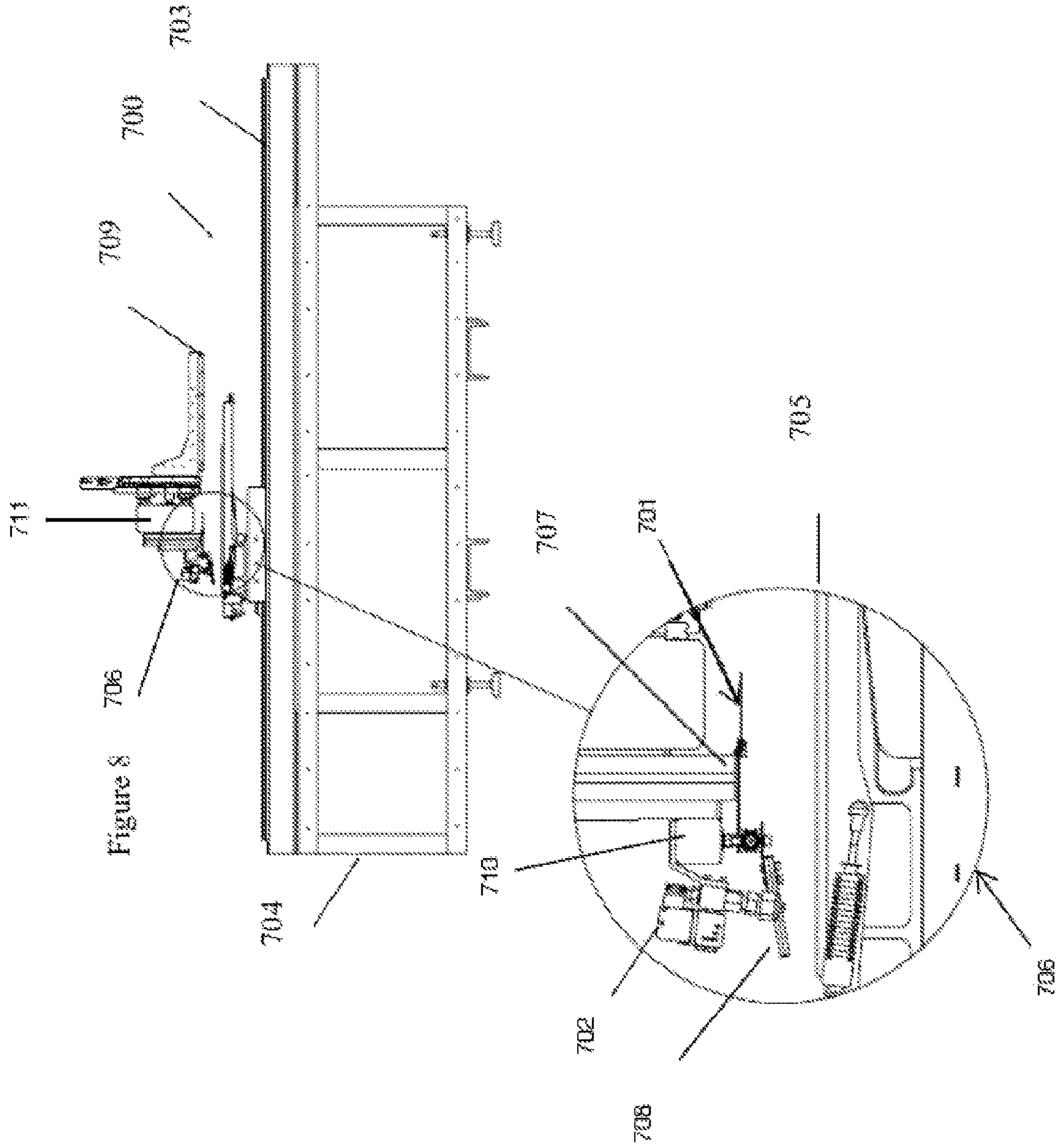
FIG. 8 presents a schematic side view of an exemplary digital printing machine comprising an exemplary flattening unit in non-operating state.

FIG. 8 is a schematic side view of an exemplary digital printing machine comprising the exemplary flattening unit of FIG. 7 in non-operating state. FIG. 8 comprises the same units that are described in FIG. 7. By means of 711 piston the tension from counterweight 708 is released and flattening unit 701 and arm 707 are withdrawn from tray 705, and thus from the item to be printed (not shown). The garment etc is able to travel to the printing unit 709 to print on the item to be printed after wetting and flattening.

Figure 9:
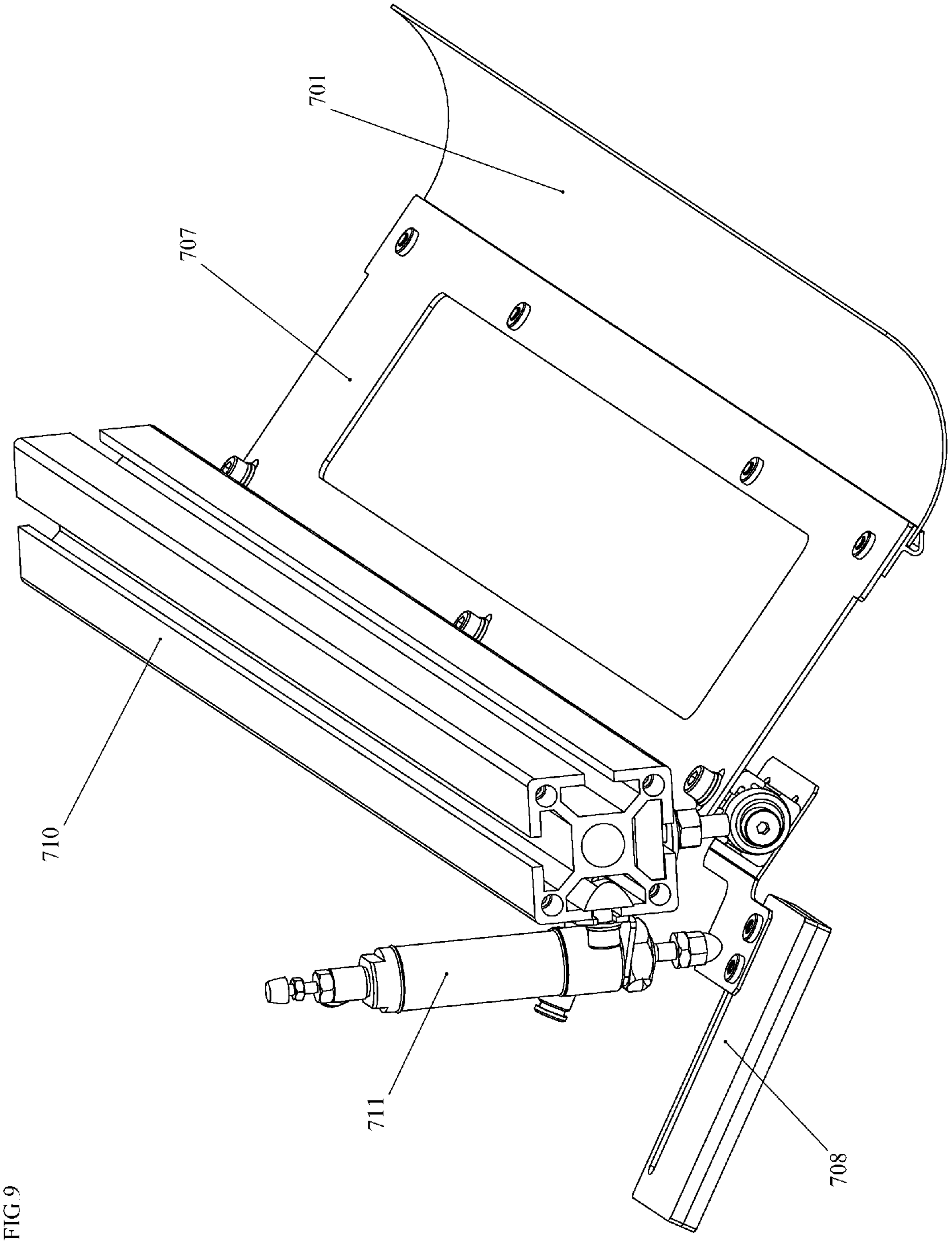
FIG. 9 presents a schematic view of an exemplary flattening unit in operative state.

FIG. 9 is a view of an exemplary flattening unit in operative state. All units shown in FIG. 9 are shown and described in FIG. 7. Flattening unit 701 is operated by reversible attachment unit 711, for example a pneumatic piston (on/off) that either attaches or separates 701 flattening unit from the printed object, in order to press on the item to be printed with the desired flattening pressure and to release as required.

Figure 10:
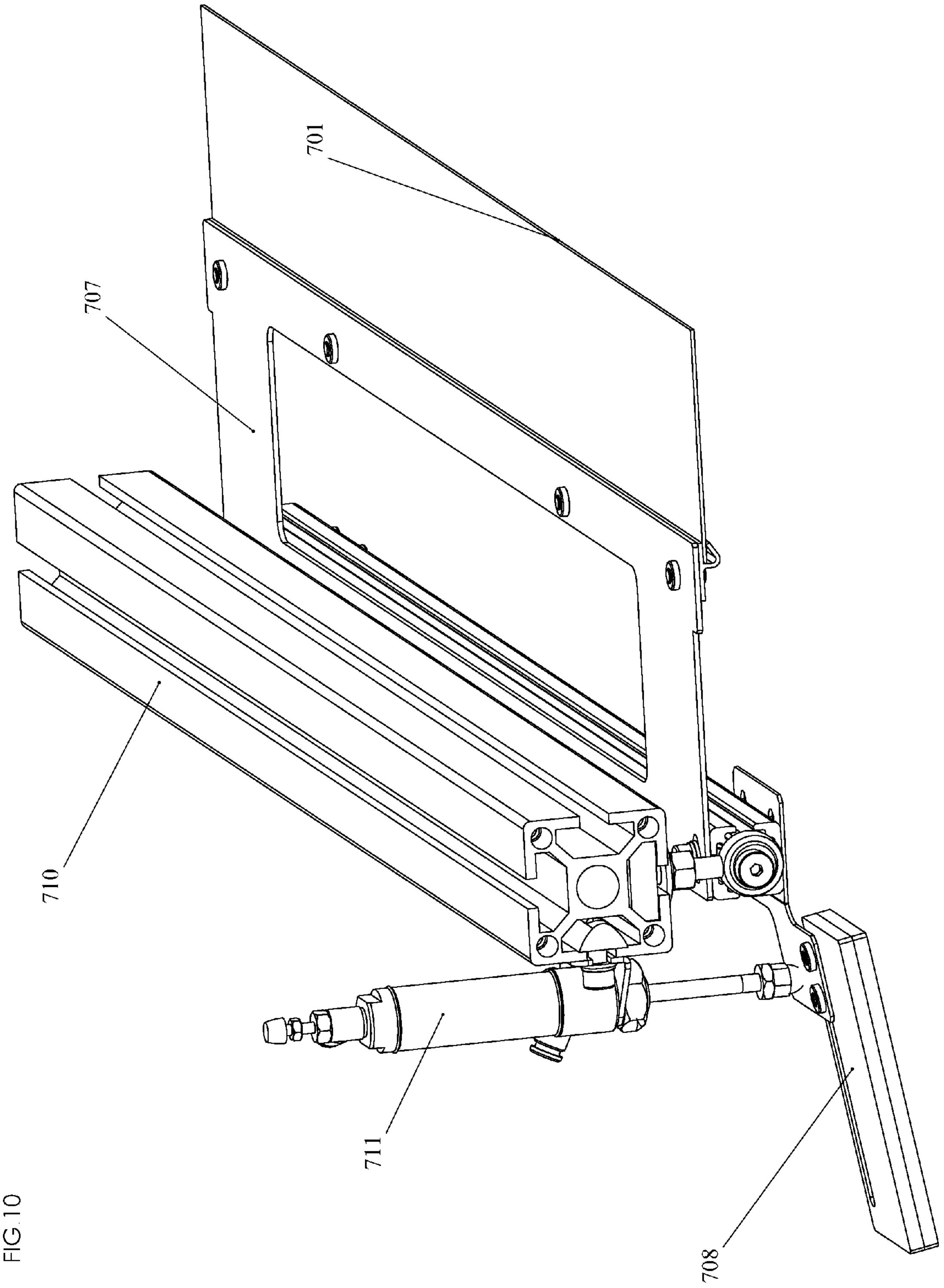
FIG. 10 presents a schematic view of an exemplary flattening unit in non-operative state.

FIG. 10 is a schematic view of the exemplary flattening unit of FIG. 9 in non-operative state. All units shown in FIG. 10 are as shown and described in FIG. 9. Flattening unit 701 and arm 707 are horizontal to the tray (not shown) and are detached from the tray in order to enable the printing unit (not shown) to print on the item to be printed after wetting and flattening.

Figure 11:
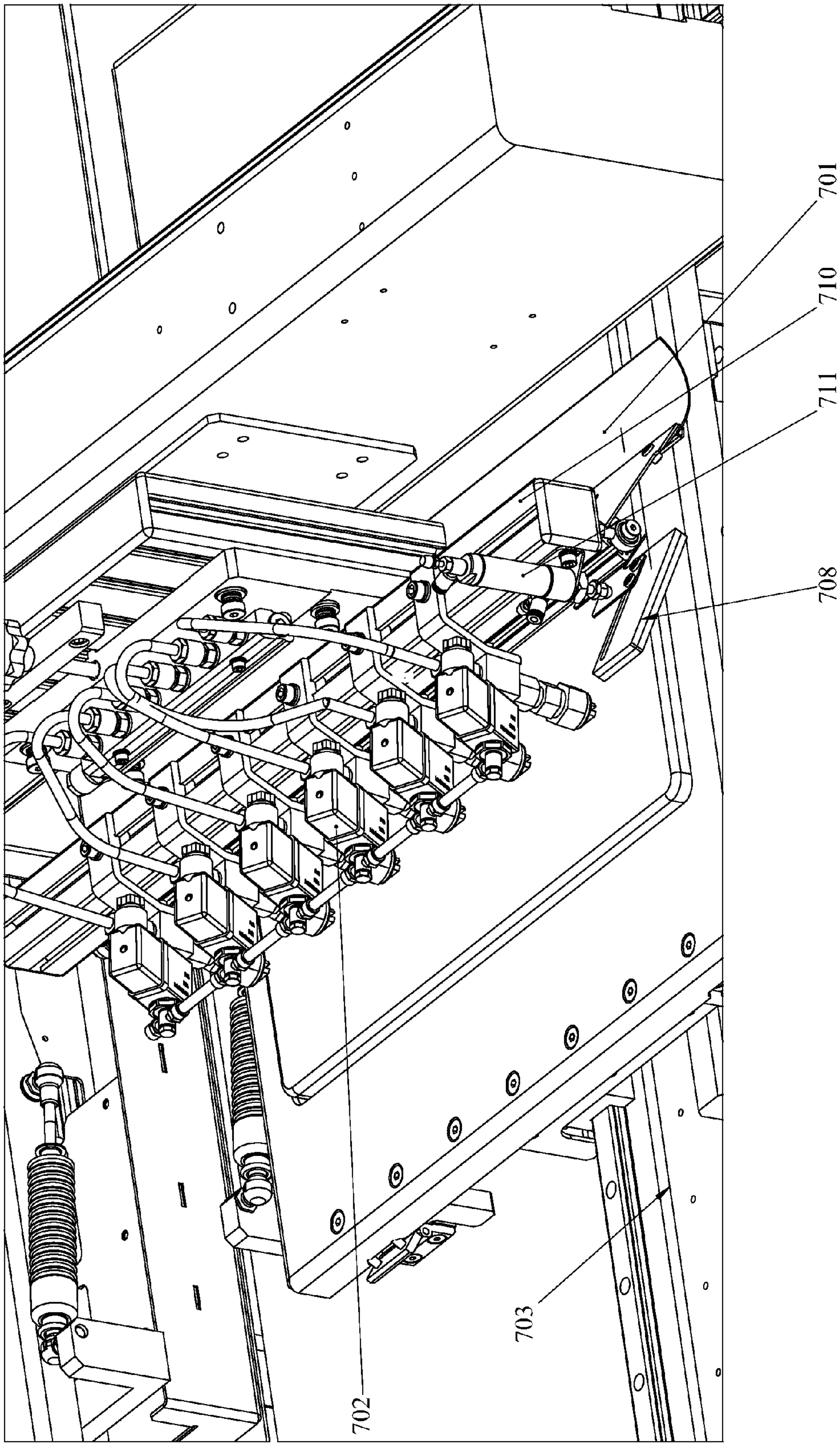
FIG. 11 presents a close up view of an exemplary digital printing machine comprising an exemplary flattening unit in operative state.

FIG. 11 is a close up view of the exemplary digital printing machine of FIGS. 9 and 10 comprising an exemplary flattening unit in operative state. Flattening unit 701 presses down on the item to be printed. FIG. 11 shows also sprinklers 702 being used for wetting before flattening.

Ink Droplet Immobilization:

As discussed hereinabove, one way to improve the sharpness of the image on the substrate is to "freeze" or immobilize the droplets on contact with the substrate. Thus, a chemical and/or physical change takes effect in the ink composition upon contacting thereof with the substrate, and this chemical and/or physical change is effected by combining agents in the wetting and ink compositions which are designed to afford the immobilization of the inkjet droplets on the substrate, which will eventually lead to better and sharper images.

The term "immobilization", as used in the context of embodiments of the present invention, refers to the act of restriction or substantial limitation of flowability of a liquid, namely substantial reduction of the capability of a liquid to move by flow. For example, immobilization of a liquid can be effected by congelation of the liquid or solutes therein. Immobilization of droplets of liquid ink can be achieved, for example, by elevating the viscosity of the liquid ink composition such that the droplets are restricted from flowing once in contact with the substrate. As used herein, the term "immobilization" is not meant to include final polymerization and print fixation by crosslinking and curing reactions.

Quantitatively, "immobilization" in the context of embodiment of the present invention is defined as elevating the viscosity of the color-bearing parts of the ink composition by 10-folds, 50-folds, 100-folds, 500-folds 1000-folds or 2000-folds and more. For example, when a given color-bearing part is characterized by having a viscosity of 10-13 cp, it is defined as immobilized when its viscosity is elevated to about 2000 cp or higher as a result of congelation.

Hence the chemical and/or physical change, according to some embodiments of the present invention, is congelation. The term "congelation", as used herein, is synonymous to the terms "coagulation", "thickening" or "gelation", and refer to the sharp decrease in fluidity of a formerly fluid liquid. Congelation can be effected also by sedimentation, precipitation, partial solidification and partial polymerization of soluble constituents in the composition.

Thus, according to some embodiments of the present invention, the liquid ink composition includes an agent that can congeal on the substrate controllably so as to avoid bleeding thereof. Once congealed on the surface, constituents in the ink composition then polymerizes during drying/curing on the surface of the substrate without being absorbed therein, and becomes affixed to the substrate by means of the formaldehyde-free crosslinking agent, thereby affording an image in the form of a film.

In order to effect congelation upon contact with the substrate and not before, the agent that can congeal on the substrate in the ink composition is separated from the factor that promotes that congelation, hence the congelation is effected when two separated formulations converge on the substrate. The two formulations cross-react with each other since one contains a property-sensitive agent and the other contains a property-adjusting agent, and the cross-reaction between the two formulations effects the congelation.

Adding a property-adjusting agent to the wetting composition and adding a property-sensitive agent to the ink composition, according to some embodiments of the present invention, effects the congelation of the colorant-bearing formulation on the substrate upon contacting the liquid ink composition with the wetting composition. This feature can be effected since the image is formed by more than one pass over the surface, and since each composition, namely the wetting composition and the liquid ink composition, can be applied by a separate mechanical element, such as a printing head or a spraying nozzle. Hence, according to some embodiments of the printing process presented herein, the wetting composition includes a property-adjusting agent and the liquid ink composition includes a property-sensitive agent. The property-adjusting agent is selected such that it effects a change in the property-sensitive agent only upon a contact therebetween, and thereby effecting congelation in the combined wetting and liquid ink compositions, the latter includes the colorant.

The term "property" as used herein refers to a chemical and/or physical property of the ink composition, namely, a characteristic of the composition that is reflected by the chemical composition and/or a physical parameter of the composition. Representative examples include, without limitation, acidity (pH), metal atom complexation, dispensability, dispersibility, solubility, ionic strength, hydrophobicity, electric charge and the likes.

The aforementioned properties may be inter-dependent, namely a change in one property effects a change in another property, thereby constituting inter-dependency therebetween. An example of such inter-dependency is a pH-dependent dispersibility and ionic-strength-dependent dispersibility, wherein the change in pH (the aforementioned acidity or alkalinity property) or the ionic-strength of a solution changes the dispersibility of one or more of its dispersed species. Similarly, there exist inter-dependency between metal atom complexation combined with pH, and the capacity to stay emulsified (dispersed), and such interdependency is discussed in detailed hereinbelow.

The phrase "property-adjusting agent" as used herein refers to a component in the wetting composition and can effect the level of one or more chemical or physical properties of the ink composition when these compositions come in contact and combine, such as a pH level, metal-atom-ligand complexation, dispersibility, the ionic strength, the hydrophobicity or the electric charge/valency of the combined composition. By effecting a change in one or more such properties, the property-adjusting agent is causing the property-sensitive agent to undergo a chemical and/or physical change to effect congelation, as discussed herein.

The term "property-sensitive agent" refers to a component of a composition which is sensitive to a change in a particular chemical and/or physical property of the composition and as a result of such a change undergoes a chemical and/or physical change which effects the entire composition. Such sensitivity can manifest itself by, for example, the loss of its ability to stay as an emulsion, an event that leads to congelation.

Property-sensitive agents can be readily affected by adding a chemical substance (the property-adjusting agent) which lowers or elevates the level of the properties listed under the term "property" hereinabove. For example, adding an acid (H+ ions) will elevate the acidity while adding a base will lower the acidity level, and thus affect a pH-sensitive agent.

Similarly adding a salt (ions of a particular valency) will elevate the ionic strength, adding a precipitating agent will lower the solubility, adding a hydrophilic agent will lower the hydrophobicity, adding a charged species will elevate the electric charge, and so on, each property can be lowered or elevated by use of a suitable adjusting agent.

Exemplary property-adjusting agents which may be use in context of embodiments of the present invention, include acids and/or bases that adjust the pH property; metal oxides, salts that adjust the ionic strength and electrical charge; or oxidizing agents, reducing agents, radical-producing agents and crosslinking agents which change the chemical reactivity of certain chemical groups present in one or more components of the other part of the ink composition and thereby effect the solubility thereof by promoting crosslinking and/or polymerization of these components.

Some colorant dispersants, such as acrylic salts, lose their dispersing attribute as a result of a pH-shift. Some pH/metal-atom complexation-sensitive acrylic polymer or copolymer, can lose its ability to stay in an emulsified form when the pH of the liquid formulation drops below a certain level and/or when a certain metal oxide is introduced, thus effecting congelation.

According to some embodiments of the present invention, the property-sensitive agent can be in the form of, for example, an emulsified co-polymerizable agent, which will congeal on the surface of the substrate due to an interaction with the wetting composition containing the property-adjusting agent. Hence, according to some embodiments of the invention, the co-polymerizable agent of the ink composition is the property-sensitive agent. Optionally or additionally, the ink composition may include additional co-polymerizable agent(s) which is not necessarily property-sensitive. As discussed hereinabove, when these constituents co-polymerize, crosslink and cure and thereby affix to the substrate, a polymeric film is formed as an image on the substrate.

According to some embodiments of the present invention, the property-sensitive agent congeals when, for example, a transition metal oxide is added or the pH or the ionic strength of the media it is dissolved in crosses a certain level. Hence, according to some embodiments of the present invention, the property-sensitive attribute are combined in a dispersant of the colorant. However, according to other embodiments of the present invention the property-sensitive agent is not required to disperse the colorant(s) or be associated therewith in any form.

Exemplary property-sensitive co-polymerizable agents include, without limitation, non-ionic water-emulsifiable resins such as acrylic polymers and copolymers, alkyl-acrylic polymers and copolymers, acrylic-styrene copolymers, polyurethanes, polyethers, polyesters, polyacrylates and some combinations thereof.

According to some embodiments of the present invention, the property-sensitive co-polymerizable agent is a self-crosslinking alkyl-acrylic copolymer, and according to some embodiments, the self-crosslinking alkyl-acrylic copolymer is an ethyl-acrylic/butyl-acrylic copolymer.

The following describes a few representative and non-limiting exemplary combinations of property-sensitive agent in a wetting compositions and property-adjusting agent in an ink composition.

An acid-base interaction can cause a dispersing pH-sensitive agent that is soluble in a basic or neutral composition to precipitate once it comes in contact with a wetting composition containing an acid. Similarly, an emulsified co-polymerizable pH-sensitive agent in the ink composition may no longer hold an emulsion as a result of a decrease in pH. In any such occurrence, the composition experiences a sharp increase in the viscosity, or congelation.

The presence of a metal oxide, such as titanium dioxide or silicon dioxide, affects a family of non-ionic acrylic polymers so as to become sensitive to a drop in the pH of the medium they are emulsified in. Hence, according to some embodiments of the present invention, the wetting composition may include such class of metal oxides which are referred to hereinbelow as a first and a second metal oxide. Such metal oxides do not cause the breakage of the emulsion in the ink composition by themselves, but rather bestow pH-sensitivity to the emulsified species. It is a matter of mechanistic theory to regard such metal oxides as direct property-adjusting agents, however in the context of embodiments of the present invention this assignment can be made or avoided without being bound to any particular theory.

Thus, the phrase "first metal oxide" and/or "second metal oxide", as used hereinbelow, refer to metal oxides that are capable of affecting a dispersing agent so as to become property-sensitive. Such metal oxides include titanium dioxide (also referred to herein as titania, $TiO_2$) and silicon dioxide (also referred to herein as silica, fumed silica, $SiO_2$).

Metal oxides are solids that can be grinded into particular particle size. In the case of titania, the particle size will determine its ability to reflect light, where larger particles will reflect light and thus appear as opaque white, and very small particles thereof, namely in the order of magnitude of nanometer scale, will be substantially transparent to light. Other metal oxide particles can be made positively charged, and in the case of fumed silica, positively charged silica particles also appear substantially transparent to light. These light reflecting qualities differentiate the first and second metal oxide classes into substantially transparent for the first metal oxide class, and substantially opaque white for the second metal oxide class.

A third metal oxide class which can be added to the wetting composition according to some embodiments of the present invention, is regarded as a direct and independent property-adjusting agent, since it effects the chemical/physical change in the property-sensitive agent without the presence of another effector, such as an acid. Thus, the phrase "third metal oxide" refers hereinbelow to a class of metal oxides that can directly effect congelation of the ink composition.

Addition of a small amount of an amphiphilic solvent, such as acetone or water miscible ketone to an aqueous-based wetting composition, may cause an emulsion in the ink composition to collapse and/or congelation and/or otherwise taking the colorant out of the dispersed state.

A property-sensitive agent being soluble in an aqueous solution will precipitate once it comes in contact with the wetting composition containing calcium and/or aluminum ions and other di- and tri-valent cations, whereupon it will precipitate and will effect a sharp increase in the viscosity of the combined parts of the composition.

A salt (ionic) interaction between anions and cations can cause a suspension or an emulsion to break, namely effect precipitate of its particulate components. Preferred salts for effecting an increase on the ionic strength include calcium salts such as calcium chloride and calcium acetate, and aluminum salts such as aluminum chloride and aluminum sulfate, and any combination thereof.

Quaternary cationic surfactants are suitable candidates for effecting congelation of the emulsified or dispersed polymers and pigments. Non-limiting examples for quaternary cationic surfactants include flocking products such as PAM (polyacrylamine), SUPERTFLOC™ C440 series (by Cytec), and benzalkonium salts such as benzalkonium chloride.

A hydrophilic-hydrophobic interaction between various solvents such as acetone alcohol, acetone, isopropyl alcohol, ethyl alcohol, and polymeric latex resin that causes the resin to swell and precipitate and effect an overall rise in the viscosity of the combined composition.

For example, adding polyvinyl alcohol with a low molecular weight to the wetting composition and adding borax (sodium tetra borate) to the ink composition will cause the formation of a gel upon contacting these two compositions. A similar effect will be achieved when using calcium acetate and isopropanol or ethanol, however higher alcohols do not afford the same result.

According to some embodiments of the present invention, the chemical property is pH, and the corresponding property-adjusting agent is a base. An exemplary basic property-adjusting agent is an amine, such as, without limitation, DEA, ammonia, TEA and alike, that may react with a corresponding property-sensitive agent, such as a thickener or a dispersing agent.

According to other embodiments of the present invention, the chemical property is pH, and the corresponding property-adjusting agent is an acid. Although most acids will cause a pH-sensitive agent to congeal, only some acids will be suitable for the aspects presented herein, which directed at inkjet printing processes, particularly those suitable for textile applications.

One exemplary acidic property-adjusting agent is an organic acid. According to some embodiments, the organic acid is a carboxylic acid. Suitable organic acids include, but are not limited to carbonic acid, formic acid, acetic acid, propionic acid, butanoic acid, an $\alpha$-hydroxy acid such as glycolic acid and lactic acid, a halogenated derivative thereof and any combination thereof.

The selection of a suitable property-adjusting agent in the form of an acid should take into account several factors, namely the corrosive nature of acids on the delicate parts of the printing apparatus and particularly the printheads and other metallic and otherwise delicate parts of the printing machine which corrode easily, as well as the tendency of acids to scorch and degrade certain substrate materials over time. Hence, the acid should be effective enough to cause the desired property-adjusting effect, mild enough so as not to generate damage to the machinery, and transitory so as not to degrade the finished product.

According to some embodiments of the present invention, acids which may be neutralized by heat are jointly referred to herein as transitory acids. Hence, the phrase “transitory acid”, as used herein, refers to an acid which can be rid of by the virtue of being volatile or intra/cross-reactive to form essentially neutral species.

While evaporation is one mechanism by which heat can reduce the presence of a volatile acid, heat can also reduce acidity in other ways. Some acid compounds may exhibit pH variability over a range of physical conditions, such as temperature. For example, some organic acid compounds may undergo a chemical reaction, such as condensations, upon applying heat to the composition. This chemical reaction ultimately leads to loss of the acidic property and an elevation and neutralization of the pH in the finished product after curing, which typically involves heating.

For example, lactic acid may be used to bring the pH of an aqueous solution to about 2-3 (pKa of 3.8 at 25° C. in water), but when heated above 100° C. in dehydrating conditions, lactic acid molecules react with one-another to afford the neutral and stable lactone specie know as lactide, which is the cyclic di-ester of lactic acid. Lactide may undergo further transformation and participate in the polymerization reaction on the substrate, as lactide is known to lead to the formation of PLA, poly-lactic acid polymers and co-polymers.

Another example for such a transitory acid is glycolic acid, which forms the cyclic and neutral lactone 1,4-dioxane-2,5-dione.

Transitoriness is required when it is desirable to have little or no traces of an acid in the final product. Therefore acid traces should be reduced before or during the curing step of the process (effected typically at 140-160° C.), and can no longer damage the substrate. On the other hand, the fumes of too-volatile acid will seep into the orifices, at print off-time, reacting with the other parts of the ink composition, causing immediate printhead blockage, and in longer time terms will cause corrosion of sensitive elements of the printing machine and the environment. Another factor is the workers health which may be adversely effected by highly volatile acid such as formic acid. In addition, some volatile acids cause noxious or unpleasant odor even if minute reminiscence thereof is left in the finished product. Some volatile acids, such as acetic acid, leave a distinct and mostly unpleasant odor, and therefore should be disfavored as noxious odor may affect the work place as well as cause malodor of the product at the end-user side. Hence, an odorless volatile or otherwise transitory organic acid should be selected when possible.

Exemplary transitory organic acids which can provide all the above advantages with minimal disadvantages include, but are not limited to, lactic acid and glycolic acid. Hence according to some embodiments, the acid is glycolic acid or lactic acid.

According to some embodiments of the present invention, the chemical property is metal-atom complexation, and an exemplary corresponding chemical property-sensitive agent is an emulsified non-ionic polymer. An exemplary metal-atom complexation property-adjusting agent is nano-sized particles of titania (nano-titania), fumed silica or alumina, as discussed hereinabove in context of the third metal oxide (e.g., transparent form of alumina or other aluminum salts).

Other property-adjusting agents suitable for this application are water immiscible solvents such as alcohols. Hence, low alcohols, such as ethanol and isopropyl alcohol, react fast enough in the ink (so as to affect the emulsion and/or dispersion) to obtain acceptable immobilization. These reagents affect the emulsion stability, thus causing the ink composition to congeal on the substrate's surface.

The concentration of the property-adjusting agent should correspond adequately to the type and amount of the property-sensitive agent, and can range from about 0.5% to about 20% of the total weight of the wetting composition.

Multi-Part Ink Composition:

According to some embodiments of the present invention, the ink composition is a multi-part ink composition, which comprises an immobilization part and one or more coloring parts that are immobilized by the immobilization part. The multi-part ink composition is applied while controlling and minimizing the time which passes between applying the various parts of the multi-part ink composition, thereby effecting the application of one part on the surface and then applying the other part(s) of the ink composition while the surface is still wet from the first applied part.

Furthermore, by minimizing the time which passes between part application, the capillary action which causes the spreading and soaking of the liquid parts can be mitigated so as to minimize and substantially eliminate the undesirable absorption of the ink into the substrate, as well as the bleeding of droplets one into another.

When using of a multi-part ink composition having an immobilization part, which is referred to herein and throughout as the first part of the multi-part ink composition, the first part can be regarded, according to some embodiments of the present invention, as the wetting composition. According to some embodiments, differences between the wetting composition as described hereinabove and the first part of the multi-part ink composition may stem from the optional modes by which the two are applied on the substrate and the mechanical flattening step of the process, which can be omitted in some of the cases of using a first (immobilization) part.

Alternatively, only the role of delivering the property-adjusting agent may be shifted from the wetting composition to the first (immobilization) part, while the role of wetting and the role of effecting other temporary modifications to the surface of the substrate are effected by the wetting composition, including its mode of application and mechanical flattening.

According to some embodiments of the present invention, the first part of the multi-parts ink composition is formulated with a first carrier (a solvent) and used to carry and deliver a property-adjusting agent, and does not contain a colorant and is thus substantially transparent and colorless, and intended not to leave a distinguishable mark on the substrate. It is the property-adjusting agent that affects a property-sensitive agent in a second color-bearing part and other optional parts of the ink composition, thereby effecting congelation of the combined parts. Hence, the first part of the ink composition, which includes a property-adjusting agent, is also referred to herein interchangeably as the immobilization part.

The second part of the ink composition, comprises a colorant, a second carrier, a co-polymerizable agent, a formaldehyde-free crosslinking agent and a property-sensitive agent in the form of, for example, an emulsified co-polymerizable agent, which will congeal on the surface of the substrate due to an interaction between the parts (e.g., an interaction induced by the property-adjusting agent).

According to some embodiments of the invention, an ingredient of the ink composition which imparts elasticity to the film (image) is the co-polymerizable property-sensitive agent. Optionally or additionally, the elasticity is imparted by an additional co-polymerizable which is not necessarily property-sensitive. As discussed hereinabove, when these constituents co-polymerize, crosslink and cure and thereby affix to the substrate, a co-polymeric elastic film is formed.

The basic process colorants in liquid ink compositions are required to be transparent or translucent, since only a few (typically 3-6) basic colors are used and the full spectrum of colors and shades is achieved when these basic colors are perceived by the eye as mixed in various combinations on the substrate. However, direct printing of multicolor images using transparent inks on any surface requires the surface, which is the background of the image, to be white or at least lightly-colored, since its inherent color participates in the formation of the final perceived color, together with the colorant in the inks applied thereon. Surfaces of black, darkly colored or otherwise non-white substrates tend to render the primary-colored ink drops indistinguishable or substantially color-skewed since the final perceived color stemming from any combination of the primary colors is a subtraction of that particular combination from the color white, or at least from a bright light color. It is therefore a physical requirement that the background of an image generated directly onto a surface be a bright light color or white.

To overcome the problem of printing on a non-white substrate, an opaque white underbase layer is printed on the substrate before the translucent colored part (second part) is printed. This opaque underbase layer is afforded by a third part of the ink composition, according to some embodiments of the present invention.

Hence, according to some embodiments of the present invention, the multi-part ink composition further includes a third part which comprises an emulsified property-sensitive agent, an opaque colorant in the form of a second metal oxide, as this phrase is defined hereinabove, and a third carrier. Optionally, the third part may include a form-aldehyde-free crosslinking agent.

The third part therefore includes an opaque and lightly-colored pigment colorant. According to some embodiments, the opaque and lightly-colored opaque pigment colorant is white, affording an opaque white layer when jetted on a darkly-colored or non-white surface. According to some embodiments, the white opaque pigment is suitable-sized particles of a second metal oxide, such as, for example, titania.

The ink composition, according to some embodiments of the present invention, is suitable for inkjet printing of "spot" colorants, which are substantially opaque colored inks. Spot colorant can be jetted like any other transparent "process" colorants, and are typically used to generate special effects in order to afford highlights and emphases over the image usually in pre-defined coloration.

Hence, according to some embodiments of the present invention, the multi-part ink composition further includes a fourth part which comprises an emulsified property-sensitive agent, a second metal oxide which is substantially opaque, a colorant and a fourth carrier. Optionally, the fourth part may include a form-aldehyde-free crosslinking agent.

The ink compositions can be designed such that the polymerization reaction between the co-polymerizable agents, the formaldehyde-free crosslinking agent and the substrate would be effected in the presence of a catalyst, also referred to as a polymerization initiator.

The term "catalyst" as used herein describes a chemical substance which is capable of promoting, initiating and/or catalyzing the chemical polymerization reaction between co-polymerizable ingredients of the ink composition, and to some extent also with the functional groups in the substrate directly or via the formaldehyde-free crosslinking agent. The catalyst, or polymerization catalyst/initiator, is selected so as to promote, initiate and/or catalyze the reaction upon contact of the ink composition with the substrate, optionally in combination with an external heat or other forms of radiation that is applied during the curing of the image.

The ink composition optionally contain one or more other ingredients according to some embodiments of the present invention, such as, for example, surfactants, humectants, wetting agents, binders, buffering/neutralizing agents, adhesion promoters, bactericides, fungicides, algicides, sequestering agents, softeners, thickeners, anti-foaming agents, corrosion inhibitors, light stabilizers, anti-curl agents, thickeners, non-reactive agents, softeners/plasticizers, specialized dispersing agents, specialized surface active agents, irradiation sensitive agents, conductivity agents (ionizable materials) and/or other additives and adjuvants well-known in the relevant art.

Non-limiting examples of anti-foaming agents (defoamer) include BYK 024, BYK 012; BYK 31 (commercially available from Byk-Chemie), FOAMEX 810, AIREX 901, AIREX 902 (commercially available from Evonik Tego Chemie GmbH, Essen, Germany), SURFYNOL DF 37, SURFYNOL DF 210, SURFYNOL DF 75 (commercially available from Air Products Ltd.), and more.

Non-limiting examples wetting agents include BYK 307, BYK 348 and BYK 3410 (commercially available from Byk-Chemie), TWIN 4000, WET 260 and WET 510 (commercially available from Evonik Tego Chemie GmbH, Essen, Germany), and more.

Exemplary softeners/plasticizers include, without limitation, an adipate ester, a phthalate ester, an aryl phosphate, a trimellitate ester and a plastisol, and many other commercially available softeners/plasticizers which are offered by such companies as ExxonMobil, Morflex and Byk-Chemie. The content of the softener/plasticizer ranges from about 0.01 weight percentage to 2.5 weight percentages of the total weight of the ink composition.

Exemplary surface active agents include, without limitation, soap, a detergent, a synthetic detergent, an emulsifier, an anti-foaming agent, a polyalkylsiloxane, an anionic surface active agent, a cationic surface active agent and a non-ionic surface active agent. The content of the surface active agent ranges from about 0.01 weight percentage to about 5 weight percentages of the total weight of the ink composition.

The table below presents the various parts of the ink composition used in the process according to some embodiments of the present invention, and lists their alternative names used herein, their function and some of their principle ingredients. It is noted that the wetting composition, may be regarded as another part of the composition albeit it is not necessarily applied on the substrate by digital means or an inkjet printhead.

Multi-part ink composition

| Term in claims | Alternative term and characteristics | Function | Principal ingredients |
|---|---|---|---|
| Wetting composition | Typically applied by spraying and can further be manipulated mechanically by squeegee or roller | Provides the property-adjusting agent, namely the constituent that causes the ink part that contains the property-sensitive agent to congeal on contact;<br>Flattens protruding fibers, smooth and even the surface before fine droplets are printed thereon | A property-adjusting agent (e.g. an acid);<br>A carrier (e.g. water);<br>An optional co-polymerizable agent (e.g. an acrylic mixture);<br>An optional formaldehyde-free crosslinking agent |
| First part | Immobilization part;<br>Generally transparent/colorless;<br>Typically printed before or concurrently with the other parts and after the wetting composition | Provides the property-adjusting agent,<br>Optionally provides some of the co-polymerization agent(s) | A property-adjusting agent (e.g. an acid);<br>A carrier (e.g. water);<br>An optional co-polymerizable agent (e.g. an acrylic mixture);<br>An optional formaldehyde-free crosslinking agent |
| Second part | Colored part;<br>Translucent color part;<br>Generally transparent and colored by CMYK basic colors;<br>Typically printed after and over the first part | Provides the colorants for the design/image which are dispersed in a property-sensitive dispersant that congeals upon contact with the property-adjusting agent;<br>Provides some of the co-polymerization agent(s) | A dispersed translucent colorant;<br>A formaldehyde-free crosslinking agent;<br>A carrier (e.g. water);<br>A property-sensitive agent (e.g. an acrylate);<br>A co-polymerizable agent (e.g. an acrylic mixture);<br>A polymerization catalyst |
| Third part | Underbase part;<br>Opaque white part;<br>Generally opaque and white;<br>Typically printed after and over the first part and before the second part | Provides a solid opaque white background to the translucent colors when printed on a non-white substrate;<br>Provides some of the co-polymerization agent(s) | A dispersed opaque colorant (e.g. a metal oxide);<br>A carrier (e.g. water);<br>A property-sensitive agent (e.g. an acrylate);<br>A co-polymerizable agent (e.g. an acrylic mixture);<br>A polymerization catalyst;<br>A formaldehyde-free crosslinking agent; |
| Fourth part | Spot color part;<br>Opaque colored part;<br>Typically printed after and over the second part | Provides a non-"process" solid opaque colored highlights of color over the design/image; | A dispersed opaque colorant (e.g. a metal oxide);<br>A dispersed translucent colorant;<br>A carrier (e.g. water); |

-continued

| Multi-part ink composition | | | |
|---|---|---|---|
| Term in claims | Alternative term and characteristics | Function | Principal ingredients |
| | | Provides some of the co-polymerization agent(s) | A property-sensitive agent (e.g. an acrylate); A co-polymerizable agent (e.g. an acrylic mixture); A polymerization catalyst; A formaldehyde-free crosslinking agent; |

The action of immobilization by congelation of the ink composition is effected upon the abovementioned chemical or physical property change caused by the property-adjusting agent that is delivered either by the wetting composition, or concomitantly with the property-sensitive agent. This instant immobilization by congelation of the jetted droplets subsequently promotes improved color and detail resolution of the image, as well as improved contact between the colorant(s) in the ink composition and the substrate, which is effected by better adhesion of the medium containing the colorant (pigment and/or dye) therein to the substrate. The binding and adhesion of the medium containing the colorant is effected via the formaldehyde-free crosslinking agent by, for example, direct heat-activated chemical crosslinking or entanglement of the co-polymerizable components in the ink composition with functional groups in the substrate.

In general, the content of the various parts of the ink composition, according to embodiments of the present invention, may vary according to the type of substrate and the specific requirements of the final printed product, yet each serve the same principles as follows. The carrier is selected to provide a medium for mixing, suspending and/or dissolving the other components of the ink composition, and is required to be volatile and benign. The colorant is selected to achieve the desirable color and other physical and chemical properties, and be suitable for a given printing machine, printheads and printing technology. The various co-polymerizable agents as well as their activating and catalyzing counterparts, when needed, are selected so as to afford the adhesion of the colorants to the surface of the substrate in a substantially irreversible manner, at least in the sense of normal use of the final product as well as capable of forming the image as a co-polymeric film based on the use of a formaldehyde-free crosslinking agent, and therefore should provide a product which is sustainability free of formaldehyde as defined hereinabove, afforded by a process during and after which essentially no formaldehyde is emitted.

The inkjet ink composition according to some embodiments of the present invention, are formulated so as to be suitable for use in an inkjet printing process. Hence, the ink compositions presented herein are formulated so as to exhibit general attributes for each of its parts, other than color and chemical composition. Thus, in some embodiments, the ink composition is further characterized by attributes such as dynamic viscosity at shear of 4000 $s^{-1}$ (standardized 35° C.), surface tension, sonic velocity, pH, maximal dispersed particle size, carrier volatility, chemical stability, bacteriostatic and anti-corrosive attributes, as well as other characteristics which are more particular to certain inkjet techniques such as electric resistance/conductance, polarizability, irradiation sensitivity and electrostatic, piezoelectric and magnetic attributes, as these terms are known to any artisan skilled in the art.

Each of the parts of the ink compositions used in the process presented herein therefore exhibits, among other properties, the following physicochemical properties which render it suitable for inkjet printing, namely:

Dynamic viscosity that ranges from about 1 centipoise (cP) to about 150 cP, or from about 8 cP to about 25 cP, or from about 8 cP to about 20 cP, or from about 8 cP to about 15 cP at typical working (jetting) temperature that ranges from about 30° C. to about 45° C.;

Surface tension that ranges from about 25 N/m to about 41 N/m;

Maximal particle size lower than about 1 micron (μm);

Electrical resistance that ranges from about 50 ohms per centimeter to about 2000 ohms per centimeter; and Sonic velocity that ranges from about 1200 meters per second to about 1800 meters per second.

As a typical printhead is resistant to pH of 4-10, the final pH of any part of the ink composition should be within these limits.

According to some embodiments, each part of the ink composition exhibits a dynamic viscosity at room temperature of about 11 centipoises, a surface tension of about 31 dynes per centimeter and a maximal particle size lower than 1 micron.

The process presented herein is designed to utilize formaldehyde-free ink compositions, according to some embodiments of the present invention, which are formulated so as to polymerize and adhere to the substrate upon curing by heat or other forms of radiation while emitting formaldehyde at or under the acceptable levels, as defined hereinabove.

According to some embodiments of the present invention, the printing process may include a surface wetting step, using a wetting composition as described herein, an image printing step using an ink composition comprising a formaldehyde-free crosslinking agent. The printing step is effected directly after the wetting step, hence the ink composition is applied on the wet surface while it is still wet from the wetting composition.

Multi-Part Printing Procedure:

Following is a detailed description of various embodiments pertaining to printing processes using multi-part ink compositions according to some embodiments of the present invention, which utilize a formaldehyde-free ink composition.

As discussed hereinabove, when used in combination with a multi-part ink composition, the wetting composition serves also a mechanical role (flattening and temporary modification of the surface), and according to some embodiments of the present invention, it can be rather simple in composition, e.g. tap water, hence it is applied in larger amounts as compared to the ink composition, using spraying mechanisms which are less accurate and controllable than inkjet printheads.

The process, according to some embodiments of the present invention, is effected by digitally applying, by means of a plurality of inkjet printheads, onto at least a portion of a surface of the substrate, the multi-part ink composition presented herein, which is formulated to be suitable for use in inkjet printheads.

As presented hereinabove the ink composition includes a first part, applied by at least one first printhead, and a second part applied by at least one second printhead, namely each part is jetted from one or more different designated printheads, wherein the first part includes a property-adjusting agent, and the second part includes a property-sensitive agent, a co-polymerizable agent, a formaldehyde-free crosslinking agent and a colorant, whereas a time interval between the application of the first part and the application of the second part is less than 1 second, thereby forming the image in a form of an elastic film attached to a surface of the substrate on the substrate.

The printing process is designed and programmed such that the various parts of the ink composition will be applied concomitantly (or essentially simultaneously) on the surface of the substrate by a digitally controlled precise mechanism, and that every drop in the color/pigment-containing parts of the ink composition (second, third and fourth) will come in contact with at least a drop of the immobilization (first) part.

The term "concomitantly", as used herein, refers to the timing of one or more occurrences which take place concurrently, or almost concurrently, namely within a short time interval. According to embodiments of the present invention, this short time interval is less than one second, less than 3 seconds, less than 5 seconds or less than 10 seconds.

The process, according to embodiments of the present invention, is based on the use of multi-components (parts) ink compositions, wherein all of the components (parts) are formulated and selected to be suitable also for the main inkjet printing techniques, such as the "drop-on-demand" technique and the likes, as these techniques are familiar to any artisan skilled in the art. Therefore, according to embodiments of the present invention, the ink composition used in the processes presented herein is for use in an inkjet printing machine, wherein each part of a multi-parts ink composition is applied (jetted, printed) from at least one different designated printhead.

The process presented herein is directed at a typical inkjet technique, as known in the art, which is performed using standard or proprietary printheads and other printing machinery.

Since each of the various parts of the ink composition used in the process presented herein is jetted by a digitally-control manner, the areas onto which each part is applied can essentially overlap, covering substantially the same area of the image (coextensive areas). In particular, the first part of the ink composition, which is essentially colorless and transparent in some embodiments, is applied onto the surface as a silhouette of the image, namely as a solid outline and featureless interior of the image. This effect further contributes to the reduction in the amount needed to effect immobilization of the ink composition, as the first part does not form extending margins peripheral to the image. This effect also widens the scope of suitable substances which can be used to formulate the immobilization part, as staining of unprinted areas of the substrate which are not covered by colorants, is no longer a problem.

While reducing the present invention to practice, it was observed that a droplet of any part of the multi-part liquid ink composition, according to some embodiments, is absorbed by a 100% cotton fabric over a time period that ranges from about 20 seconds to 5 minutes, depending on wetting properties of the various parts. This time rage for soaking in 100% cotton fabric was observed also for tap water. When synthetic components are blended into the fabric, the fabric becomes less wettable and the absorption (soaking) time increases. The process settings and results also depend on the finish of the fabric.

One factor that accomplishes satisfactory immobilization is the speed at which the congelation is accomplish. It is accomplish best when a single droplet of any of the pigment-containing parts of the multi-parts ink composition (opaque or colored parts) comes in contact with a droplet of the immobilization part prior to accumulation of many additional droplets of any part. The time (speed) factor may determine if a large drop is formed or not, taking into account that larger drops may soak faster into the substrate in cases of absorptive substrates, or coalesce (joining with other droplets) as a result of partial dewetting, leading to the formation of non-uniform and poor coverage of a non-absorptive substrate.

The process presented herein, according to some embodiments thereof, is effected by applying all the various parts of the multi-parts ink composition by means of separate inkjet printheads concurrently, substantially concomitantly, or very near concomitant application thereof, namely at a time gap or interval that is shorter than about 1-10 seconds between the time a droplet of a part containing a property-adjusting agent or property-sensitive agent contacts the substrate, and the time a droplet of the counterpart component contacts the same region of the substrate. According to some embodiments of the present invention, this time interval can be shorter than 0.75 second, shorter than 0.50 seconds and even shorter than 0.25 seconds.

Another factor which governs the wicking of a liquid droplet into an absorptive substrate is the size of the droplet. A small and light-weight droplet will tend to stay atop the surface rather than be smear and soaked into it. Small drop-size is also advantageous in case of an impervious/impregnable substrate, as small drops are less prone to spreading and smearing. Hence, according to some embodiments of the present invention, the average jetted drop volume of each of the parts of the ink composition ranges independently from 50 pico liter to 100 pico liter (pL). At this size, the plurality of jetted droplets, stipulating they are discreet, are small enough to stay atop rather than be smear and soaked into the substrate. Being substantially small and spaced not too densely prior to the congelation reaction between the droplets of the pigment-containing parts and the droplets of the immobilization part, a plurality of such droplets can cover an area without compromising on its coverage and its newly-applied color perception.

The process, according to some embodiments of the present invention, is suitable for inkjet printing a color image on a surface of any desired color or shade.

In general, a conventional inkjet printing on any surface involves the visual blending of colorants in a form of a particular mix of different colorants on the printed surface. In the jargon of the art, a "process colorant" is substantially transparent and a "spot colorant" is substantially opaque. Spot colorant can be jetted like process colorants, and are typically used on top of process colorants in order to afford highlights and emphases over the image usually in pre-defined coloration.

As further discussed hereinabove, ink-jet printing of high-quality and high-resolution is based on placing very small dots of several basic colors in proximity so as to create a full spectrum of colors from the visual (perceived) mixing of these basic colors. Each location of the image may be a unique blend of basic colorants constituting a unique color. Thus, the transparency of the ink is crucial for creating the full spectrum as incident and substantially "white light" is filtered through the basic colors mix and reflected as a colored light back to the observer. The reflection of the light depends on the absorption of the background surface, hence on its color, and therefore non-white surfaces do not reflect all colors and as a result the ink or ink mixes forming the printed image are not perceived in their intended colors.

Thus, the key limitation in printing substantially transparent liquid ink compositions on any non-white surface, and especially on darkly colored or transparent surfaces, stems from the inability of the non-white surface to reflect white light from the surface back through the applied transparent ink and to the eye of the observer, which renders the image dull, dark and color-skewed. Therefore presently known printing technologies are limited when applied on darkly colored or otherwise non-white surfaces.

In cases where the surface is a dark surface, the process may employ the use of a third part of the ink composition such that can form a lightly colored or white opaque underbase (background) for the colored image. The third part is applied (jetted) from at least one printhead referred to as a third printhead, designated to apply the opaque and lightly-colored pigment.

As in the case of the second part of the ink composition (the colored part), the third part (the white opaque underbase part or the opaque underbase part), is applied as a silhouette of the image, not extending outside its outline, unless a particular part of the image is defined as white.

The second part (colored part), which typically includes 4 process colors and spot colors, is formulated to have a lower ratio of stretchability since it is typically applied on-top of a white (lightly-colored) substrate or over the white (lightly-colored) opaque underbase layer.

According to some embodiments of the present invention, the application of each of the parts of the ink composition is effected concomitantly; as exact simultaneous application is not possible (only one printhead can be positioned over any given point of the substrate at any given point in time). However, in typical inkjet machines, and particularly in wide-format inkjet printers, the image is formed in a series of passes, or strips, applied in a predetermined sequence so as to optimize the time it takes to cover the entire printed area at a minimal time and number of passes.

Hence, according to some embodiments of the present invention, the application of the first (immobilization) part precedes the application of each of the second and third parts. According to other embodiments, since the immobilization part is effective also when applied shortly after the other parts, the application of the third part may precede the application the first and second parts. According to yet other embodiments, where a third (underbase) part is not used, for instance on a white substrate, the application of the first and second parts can be substantially concomitant, namely there is no significant difference in the final result if one of the first or second parts reaches the surface before the other at a minute time difference ranging from 0 to 1 seconds. This is also the case when the first and third parts are relevant, namely as long as the top layer is the colored part is applied on top of layers of either the first or the third part, the final result is the same desirable result.

According to some embodiments of the present invention, the first part is applied concomitantly with both the third and the second parts, namely the first and third parts (immobilization part and opaque underbase part respectively) are applied in the first pass, followed shortly thereafter, in less than a second, with a pass wherein the first part is applied concomitantly with the second part (immobilization and colored parts). According to these embodiments, the immobilization part is applied in both passes, once concomitantly with the white background, and again concomitantly with the process colors.

Alternatively, the printing process is effected by applying two complete layers, namely one layer comprising the opaque underbase part, which is printed in its entirety before the following layer of the colored part of the ink composition (comprising CMYK colorants and the likes) which is applied thereon. In these embodiments the immobilization part is applied concomitantly with the (white) opaque underbase part, and then an additional portion of the immobilization part may be applied concomitantly with the colored (CMYK or RGB) part of the ink composition.

As in typical inkjet process, the colors are jetted in amounts which correlate to the type of substrate, its color and the desired color intensity and coverage in each given segment of the image. Increasing color intensity can be afforded by increasing the drop density per unit area. The drop density output of a given printhead (namely without changing the type of printhead) per unit area, can be increased by increasing the number of passes of the printhead(s) over the area and/or increasing the number of printheads jetting the same fluid. In order to provide an effective underbase for color images printed on darkly-colored substrates, the jetted amount of the underbase part is typically larger than the jetted amount of the colored part(s) of the ink composition, as high as 5-fold respectively, therefore lower resolution in large part of the underbase may be applied using larger drops. However, the amount of the underbase part needed to be applied on a dark stretchable substrate can be reduced dramatically if pre-wetted with a wetting composition, as simple as tap water or another wetting solution, and then wiped with a squeegee prior to applying the underbase part, as described in U.S. Patent Application having Publication No. 2011/0032319, which is incorporated by reference as fully set forth herein.

It is noted herein that the fourth part of the ink composition, which is an opaque and colored ink part, providing "spot colorant" inks to various regions of the image, is regarded and treated similarly as the second part of the ink composition, except for the appearance of each, the second part contains transparent ingredients and the fourth part contains opaque ingredients. Hence throughout the discussion of the process of printing, the second part and the fourth part are synonymous in terms of amounts and order of jetting with respect to the first part (immobilization part) of the ink composition.

The third part (the opaque and typically white underbase layer) is applied in an amount that would reflect the uneven (non-flat), and hence greater surface area of some of the substrates for which the present invention is provided for. For example, the surface of a fabric exhibits ridges and grooves, and the white layer should fill these textural features in order to provide an evenly filled, continuous layer for the colored part which will be applied thereon. Hence the amounts of the third part are typically higher than, and mostly more then double, the amounts of the colored part, depending on the masking capacity of the underbase layer with respect to the dark color of the substrate.

As discussed hereinabove, the flatness and smoothness of the surface, particularly that of fabric substrates, is one of the main contributors to the quality of the resulting ink-jetted image applied thereon. This is fundamentally different that applying a similar image on intrinsically smooth surfaces, such as paper. The grooves, valleys and ridges formed by the threads, even in non-woven fabrics, and the protruding fibers, affect the image adversely.

While the immobilization reaction substantially prevents the absorption of the jetted droplets, the typically non-planar surface of the garment fabric poses a problem of relatively very large area coverage, as the fabric surface contains valleys and ridges in order of magnitude much greater then the jetted droplets.

This uneven microscopic surface of a fabric-like substrate leads to uneven coverage thereof by the microscopic droplets which experience relative dramatic variations in the slope angles upon impact, at various locations of the surface. The uneven surface of a fabric-like substrate poses a particular problem when the fabric is non-white and the image is printed using an ink composition having a third opaque underbase part. If applied on an uneven surface, the underbase part must be applied in such amount that would fill-in and practically flatten the uneven surface; hence the underbase part must be applied on uneven surfaces at large amounts, leading to excessive usage of ink, energy and time.

As discussed hereinabove, temporary flattening or planarization of the surface of the substrate with respect to the jetted droplets can be achieved by spraying the fabric with a wetting composition (such as, for example, tap water), which allows faultless coverage of the surface on the sprayed areas with a layer of the multi-parts ink having an opaque or colored part which are immobilized concomitantly with an immobilization part on the watered/sprayed areas. It was found that wetting of the substrate with tap water, thus forming a temporary planar surface, dramatically reduces the amounts of the opaque underbase part to be applied. Therefore the amount of sprayed wetting composition depends on the smoothness and microscopic planarity of the receiving substrate.

As further discussed hereinabove, in order to improve the smoothness of the wetted substrate's surface, a mechanical device such as a squeegee, "air knife" or any other form of a flat strip-shaped, blade-shaped or roller-shaped mechanical object may be passed across the wetted surface so that apply pressure on the wetted substrate, thereby flattening these fibers and other protruding features therein that may cause uneven capturing of the ink droplets.

A Formaldehyde-Free Product:

The product of the printing process presented herein, is typically an object or substrate which is decorated with a formaldehyde-free image or another design printed on its surface. The process is suitable for absorptive and/or non-absorptive, rigid as well as flexible and stretchable substrates. As discussed hereinabove, being formaldehyde-free, the objects are also suitable for use by infants or babies according to some embodiments of the present invention.

In the context of embodiments of the present invention, "infant" encompasses babies and children of all ages including the yet to be born (i.e., pregnant women). In the context of the formaldehyde-free composition and process according to some embodiments of the present invention, the requirement of avoidance and minimization of formaldehyde and exposure thereto is extended to any human, and particularly vulnerable humans in terms of health and sensitivity to harmful chemicals, such as formaldehyde.

Exemplary rigid or semi-rigid objects and substrate which are also in use by infants, for which the process is also directed at according to some embodiments of the present invention, include wooden and plastic toys, containers, bottles and pacifiers.

Exemplary flexible absorptive substrates, which can also be used by infants include, without limitation, paper, cardboard, textile fabrics, cloths and garments of all sorts and types including woven and non-woven materials and fabrics.

Other exemplary substrates include, without limitation, absorptive cellulosic or synthetic textile fabrics, soft signage media and other composite synthetic impervious materials, laminated, coated and plasticized surfaces of various materials, as well as other substrates which are substantially impregnable to liquids, metal foil, plastic and other natural and/or man-made polymeric materials.

According to the present invention, textile fabrics may include wool, silk, cotton, linen, hemp, ramie, jute, acetate fabric, acrylic fabric, LASTEX™, nylon, polyester, rayon, viscose, spandex, metallic composite, carbon or carbonized composite, and any combination thereof. According to some embodiments, the substrate onto which the image in printed on is a garment made of a textile fabric, and according to other embodiments it is comprised substantially of cotton.

The surface described above may form a part of an object that is made of the same material or, alternatively, of an object that includes one or more additional stretchable and/or flexible layers such as, for example, a paper layer, a foam layer, a textile fabric layer, a natural or synthetic rubber layer, a metal foil layer, a resin layer and the likes, and any combination thereof.

In general the surface can be of all materials and combinations of various materials, which are designed for a variety of applications, including printed commercial objects, sales promotion items, printed textiles, T-shirts, accessories, knitted, soft toys, baby products and apparel, knitted, woven and non-woven materials, home furnishings, play and baby-change table covers, flags and banners, soft signage, and the likes.

All of the above exemplary objects and many others, which are used as substrates for the printing process according to some embodiments of the present invention, exhibit a formaldehyde level which is equal or less than 20 ppm.

Moreover, the resulting image, according to the present invention is unique in the sense that it combines the high qualities afforded by the process, with the safety of use of the printed objects by infants.

Therefore, according to another aspect of the present invention there is provided an object having an image printed thereon by the printing process as described hereinabove using a formaldehyde-free crosslinking agent in the ink composition as described hereinabove. The object, according to some embodiments of the present invention, is characterized by a formaldehyde level which is equal or less than 20 ppm.

According to some embodiments, the object having an image printed thereon by the printing process as described hereinabove using a formaldehyde-free crosslinking agent in the ink composition as described hereinabove, is characterized by having no formaldehyde, or an undetectable level thereof.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions; illustrate the invention in a non limiting fashion.

General Printing Procedure:

All the Examples below were executed, or can be executed, on a digital printing machine such as, for example, a digital printing machine "STORM", manufactured by Kornit Digital Ltd., Israel, and equipped with a battery of printheads, as described hereinabove, and a "squeegee" device as described herein.

Printing frequency (the rate at which the digital data signals, 0 for close or 1 for open, are transmitted to the printhead) of 10-20 KHz at resolution range of 363-727×363-727 dots per inch (dpi).

At these settings, one full printhead wide strip is printed in 4-8 passes in order to obtain high resolution and over-coverage of the substrate. The distance between nozzles line in two adjacent printheads is 25 mm, and 100 mm for two most distant printheads. At this configuration the time between a pass applying one part of the ink composition and the time another part is jetted is about 0.02 seconds for two adjacent printheads printing at 15 KHz and at 363 dpi, to 0.72 seconds printing at 10 KHz and 727 dpi for the most remote positioned printheads.

While conceiving the present invention it was observed that the time taking an aqueous based ink composition or a part thereof, such as the immobilization part, to soak into the fabric after jetting, is well over 60 seconds. The soaking time for an aqueous opaque white part of the ink composition is the shortest, as compared to the immobilization part and the colored parts, and was observed as about 20 seconds. Twenty seconds is the approximate minimal soaking time of ink droplets which was measured on white cotton fabrics treated differently by various suppliers.

These observations mean that the time of reaction between any two parts of the ink composition, which is almost instantaneous, is shorter by more then an order of magnitude then the time of soaking of the liquids into the substrate, ensuring that the immobilization of the droplets is achieved before capillary action takes place.

The applied amount of each part of the ink composition should be such that a clear and vivid image is formed, without excess ink which leads to smearing, prolonged drying and curing time and costly waste.

The amount of the part which is jetted first (not necessarily the "first part") should flatten the protruding fibers in case of untreated textile. This effect will ensure that the next parts of the jetted ink composition that reach the substrate do not encounter perpendicular fibers that prevent the jetted droplet from reaching the surface of the substrate, and may be visible after drying over and around the outline of the image and obscure or fuzz the printed image.

According to some embodiments, the opaque white underbase part of the ink composition was jetted by 3-4 printheads at a total amount of about 0.15 grams per square inch. Each of the CMYK pigments was jetted by separate printheads, each printhead applying about 0.024 grams per square inch, and assuming coverage of 140% by total 4 colors, the amount of jetted colored part was about 0.032 grams per square inch. The immobilization part of the ink composition was applied at a rate of about 0.032 grams per square inch when immobilizing the opaque white underbase layer, and 0.007 grams per square inch when immobilizing the colored part layers.

At the same time that the printed image is cured on the fabric by heat-activated catalysts (80-160° C.) which activate crosslinking agents that bind to functional groups in the substrate, all the carriers should be evaporated from the substrate, preferably before the crosslinking reaction begins. According to embodiments of the present invention, the timing and duration of the curing stage can be easily optimized due to the reduced total amount of applied ink composition in terms of total liquids to be evaporated, which shortens the final drying time, as compared to other printing techniques and particularly as compared to the amount of liquids applied in other processes using a wetting composition with or without a property-adjusting or property-sensitive agent(s). The reduced amount of applied liquids opens the possibility of using reagents of a lower evaporation rate. This also realizes a great saving and cost reduction of drying equipment and energy.

It is noted herein that elevated-temperature curing is an optional part of the process, and may be omitted when the ink composition of choice is such that does not require elevated-temperature curing. It is noted herein that elevated-temperature curing can be omitted when the polymerization reaction can occur under 60-80° C. due to particular selection of certain ingredients such as polymerization initiators/catalysts, monomers/oligomers and/or crosslinking agents.

Printing was typically performed on the surface of an untreated 100% white or black knitted cotton T-shirt. Similar results were obtained when images were printed on a surface of 50% cotton and 50% polyester.

Untreated fabrics are fabrics which are used "as is" in the exact state at which they are provided by the manufacturer. Specifically, when the term "untreated" is used herein to describe fabrics and other substrates, it is meant to describe substrates for which no chemical preparation step was taken in order to render them ready for inkjet printing other than placing the substrate in the printing machine.

It was also found that printing on 100% polyester fabric, knitted, woven, non-woven materials, soft signage and other non-fibrous materials, a binder may not be required in the immobilization part of the ink composition since the problem of protruding fibers is lessened.

Unless otherwise stated, the test printing was performed on a 100% knitted cotton white, light dyed or darkly dyed T-shirts purchased from Anvil Ltd. or on a 100% knitted cotton black T-shirts (Beefy-T) purchased from Hanes. The T-shirts were used "as is", while the darkly dyed garments were ironed for 5 seconds at 160° C. using an automatic press. All measurements of optical densities were performed on images which were printed on identical shirts (same production batch) that were printed at different pretreatment modes.

The merits of the resulting multicolor image was assessed both qualitative (visually inspected) and quantitative (numerically parameterized). An exemplary multicolor standard-testing image was printed for a qualitative and quantitative assessment of the printing process and the resulting image.

The printing tests presented herein were conducted using a printing machine equipped with a wetting apparatus and a fiber-flattening device, as disclosed in the aforementioned U.S. Patent Application having Publication No. 2011/0032319, which is incorporated by reference as fully set forth herein. This machine allows for the wetting of the surface of the substrate, which is thereafter gently pressed by a "squeegee" or a flattening device, causing any protruding fibers in the knitted T-shirts to stick to the surface, and also temporarily fills grooves and dimples in the surface with a small amount of water or another wetting solution, thereby affording a temporarily flattened and even substrate surface.

The white underbase part on black fabric was printed either directly on dark shirt without spraying the substrate with water, or on black fabric sprayed with tap water and flattened with a squeegee. When the knitted fabric was sprayed with tap water, the amount of the white underbase part of the ink composition required to reach a complete coverage of the designated area, was remarkably smaller than for print tasks of identical images and identical substrates but without the water and squeegee treatments.

The standard-testing image included a pattern of squares, each square represents a different combination of CMYK pigments (column-wise) and different pigment dilution (row-wise), printed at a basic resolution of 545×545 dpi, wherein the rows represent colored pigment dilution going from 100% (undiluted) down to 10% in equal intervals of 10% plus a row representing dilution of the colored pigment to 5%, and further having three rows representing binary mixtures of Y+M, Y+C; C+M printed simultaneously.

All prints were cured in hot air drier unit prior to analysis. Curing cycle was effected for 160-300 seconds at 140-160° C.

Example 1

The wetting of the substrate with a wetting composition and/or an first (immobilization) part of a multi-part ink composition was effected with the following formulations presented below. These formulations were used to wet the surface of the substrate for the color-baring formulations presented in the following examples.

These formulations were used for a single part white ink composition, a white ink composition printed on a black cloth after being wetted with a wetting composition as disclosed in WO 2005/115089, and a two-part ink composition having an immobilization part and a white/CMYK-colored part. The white-colored and CMYK-colored formulations, containing the formaldehyde-free crosslinking agents are presented in the following examples.

The formulation and attributes of the first part of the ink composition (the immobilization part which contains the property-adjusting agent) is presented below in Table 1, the wetting composition in Table 2 and the white colored part in Table 3.

TABLE 1

| Immobilization Part | |
|---|---|
| Property-adjusting lactic acid | 9% |
| Ammonia (for buffering the acid) | 3% |
| A mixture of propylene glycol, diethylene glycol, glycerin and/or other polyols (as humectants) | 50% |
| Benzotriazole (as anti cupper corrosion agent) | 0.40% |
| Sodium nitrate (as anti corrosion agent for ferrous metals) | 0.20% |
| Acrylic emulsion (film-forming binder) Appretan E 6200 (Tg −20° C.) | 35% |
| Deionized water | to 100% |
| Viscosity at 34° C. | 10 cp |
| pH | 4.7 |
| Surface tension | 37 N/m |

TABLE 2

| Wetting composition (Prior Art Formulation) | |
|---|---|
| Acetic acid (as a transitory organic acid) | 2.5% |
| BYK 348 (as a wetting agent) | 0.15% |
| Tap water | to 100% |
| Viscosity at 34° C. | 1-2 cp |
| pH | 2.5 |
| Surface tension | 31 N/m |

Example 2

Following are some general ink compositions, according to some embodiments of the present invention, which comprise formaldehyde-free crosslinking agents from the family of the heteroaryl polycarbamate-based crosslinking agents.

Since most heteroaryl polycarbamate-based crosslinking agents were not developed for use in aqueous-based inkjet compositions, these agents are less soluble in water than other crosslinking agents. However these agents readily dissolve in alcohols and/or glycols. Hence, the organic solvents mixture component of all the parts of the ink composition which contain a crosslinking agent have been adjusted so as to promote the dissolution of heteroaryl polycarbamate-based crosslinking agents with and introduce the crosslinking agents into the aqueous media by, for example, using more polar humectants.

Table 3 presents an exemplary third (underbase) part of an ink composition, using CYLINK® 2000 (available from Cytec Industries, USA), a carbamate-based crosslinking agent according to some embodiments of the present invention, as an exemplary formaldehyde-free crosslinking agent.

TABLE 3

| Opaque white (underbase) part comprising | |
|---|---|
| A second metal oxide (acting also as colorant) | 15-20% |
| Property-sensitive co-polymerizable agent | 25-45% |
| An optional co-polymerizable agent | 15-20% |
| Polar humectants (glycol mixture) | 30-45% |
| Dispersant | 1-6% |
| CYLINK ® 2000 (as a carbamate-based crosslinking agent) | 0.5-1.5% |
| Bactericide/Fungicide | 0.1-0.5% |
| Blocked acid catalyst | 0-0.75% |
| Neutralizing/buffering agent | 0.1-0.2% |
| Defoamer | 0.2-0.4% |
| Wetting agent/surfactant | 0.1-0.5% |
| Organic solvent | 0-5% |
| Other additives | 0-10% |
| Deionized water | To 100% |
| Tg of the film-forming agent | −35 to 0° C. |
| Viscosity at 34° C. | 12-14 cp |
| pH | 8-8.5 |
| Surface tension | 25-36 N/m |

Table 4 presents an exemplary second (colored) part of an ink composition, using CYLINK® 2000, a carbamate-based crosslinking agent according to some embodiments of the present invention, as an exemplary formaldehyde-free crosslinking agent.

TABLE 4

| Colored (CMYK) part comprising glyoxal | |
|---|---|
| A colorant mixture | 10-20% |
| Property-sensitive co-polymerizable agent | 25-30% |
| A first metal oxide (optional if using a third metal oxide) | 10-20% |
| Polar humectants (glycol mixture) | 20-40% |
| CYLINK ® 2000 (as a carbamate-based crosslinking agent) | 0.5-1.5% |
| Bactericide/Fungicide | 0.1-1% |
| Blocked acid catalyst | 0-1.5% |
| Neutralizing/buffering agent | 0.2-0.6% |

TABLE 4-continued

| Colored (CMYK) part comprising glyoxal | |
|---|---|
| Defoamer | 0.1 0.6% |
| Wetting agent/surfactant | 0.1-2% |
| Organic solvent | 0-5% |
| Other additives | 0-2% |
| Deionized water | To 100% |
| Tg of the film-forming agent | −35 to 0° C. |
| Viscosity at 34° C. | 10-13 cp |
| pH | 8-8.5 |
| Surface tension | 25-36 N/m |

Example 3

Following are some alternative general ink compositions, according to some embodiments of the present invention, which comprise other formaldehyde-free crosslinking agents from the family of the heteroaryl polycarbamate-based crosslinking agents.

Table 5 presents an exemplary second (colored) part of an ink composition, using glyoxal, which is completely soluble in water, as an exemplary formaldehyde-free crosslinking agent, according to some embodiments of the present invention.

TABLE 5

| Colored (CMYK) part comprising glyoxal | |
|---|---|
| A colorant mixture | 10-20% |
| Property-sensitive co-polymerizable agent | 25-30% |
| A first metal oxide (optional if using a third metal oxide) | 10-20% |
| Humectants (glycol mixture) | 20-40% |
| Glyoxal 40 (as a dialdehyde crosslinking agent) | 5-10% |
| Bactericide/Fungicide | 0.1-1% |
| Blocked acid catalyst | 0-1.5% |
| Neutralizing/buffering agent | 0.2-0.6% |
| Defoamer | 0.1 0.6% |
| Wetting agent/surfactant | 0.1-2% |
| Organic solvent | 0-5% |
| Other additives | 0-2% |
| Deionized water | To 100% |
| Tg of the film-forming agent | −35 to 0° C. |
| Viscosity at 34° C. | 10-13 cp |
| pH | 8-8.5 |
| Surface tension | 25-36 N/m |

Table 6 presents an exemplary third (underbase) part of an ink composition, using glyoxal as an exemplary formaldehyde-free crosslinking agent, according to some embodiments of the present invention.

TABLE 6

| Opaque white (underbase) part comprising glyoxal | |
|---|---|
| A second metal oxide (acting also as colorant) | 9-20% |
| Property-sensitive co-polymerizable agent | 25-45% |
| An optional co-polymerizable agent | 15-20% |
| Humectants (glycol mixture) | 30-45% |
| Dispersant | 1-6% |
| Glyoxal 40 (as a dialdehyde crosslinking agent) | 5-10% |
| Bactericide/Fungicide | 0.1-0.5% |
| Blocked acid catalyst | 0-1.5% |
| Neutralizing/buffering agent | 0.1-0.2% |
| Defoamer | 0.2-0.4% |
| Wetting agent/surfactant | 0.1-0.5% |
| Organic solvent | 0-5% |
| Other additives | 0-10% |
| Deionized water | To 100% |
| Tg of the film-forming agent | −35 to 0° C. |
| Viscosity at 34° C. | 12-14 cp |
| pH | 8-8.5 |
| Surface tension | 25-36 N/m |

Table 7 presents an exemplary second (colored) part of an ink composition, using diacetone acrylamide (DAAM) and hydrazine as an exemplary formaldehyde-free crosslinking agent, according to some embodiments of the present invention.

The mixture of diacetone acrylamide (DAAM) and hydrazine react in situ when the composition is dried or cured, and serves as crosslinking agent for acrylic emulsions that serve as a binder to the fabric.

TABLE 7

| Colored (CMYK) part comprising DAAM/hydrazine | |
|---|---|
| A colorant mixture (typically a concentrated dispersion) | 10-20% |
| Property-sensitive co-polymerizable agent | 25-30% |
| A first metal oxide (optional if using a third metal oxide) | 10-20% |
| Humectants (glycol mixture) | 20-40% |
| DAAM | 0.8-1.5% |
| Hydrazine | 0.9-2% |
| Bactericide/Fungicide | 0.1-1% |
| Blocked acid catalyst | 0-1.5% |
| Neutralizing/buffering agent | 0.2-0.6% |
| Defoamer | 0.1-0.6% |
| Wetting agent/surfactant | 0.1-2% |
| Organic solvent | 0-5% |
| Other additives | 0-2% |
| Deionized water | To 100% |
| Tg of the film-forming agent | −35 to 0° C. |
| Viscosity at 34° C. | 10-13 cp |
| pH | 8-8.5 |
| Surface tension | 25-36 N/m |

Table 8 presents an exemplary third (underbase) part of an ink composition, using diacetone acrylamide (DAAM) and hydrazine as an exemplary formaldehyde-free crosslinking agent, according to some embodiments of the present invention.

TABLE 8

| Opaque white (underbase) part comprising DAAM/hydrazine | |
|---|---|
| A second metal oxide (acting also as colorant) | 15-20% |
| Property-sensitive co-polymerizable agent | 25-45% |
| An optional co-polymerizable agent | 15-20% |
| Humectants (glycol mixture) | 30-45% |
| Dispersant | 1-6% |
| DAAM | 0.8-1.5% |
| Hydrazine | 0.9-2% |
| Bactericide/Fungicide | 0.1-0.5% |
| Blocked acid catalyst | 0-1.5% |
| Neutralizing/buffering agent | 0.1-0.2% |
| Defoamer | 0.2-0.4% |
| Wetting agent/surfactant | 0.1-0.5% |
| Organic solvent | 0-5% |
| Other additives | 0-10% |
| Deionized water | To 100% |
| Tg of the film-forming agent | −35 to 0° C. |
| Viscosity at 34° C. | 12-14 cp |
| pH | 8-8.5 |
| Surface tension | 25-36 N/m |

Example 4

Following are some alternative general ink compositions, according to some embodiments of the present invention, which comprise other formaldehyde-free crosslinking agents from the family of carbodiimides-based crosslinking agents.

Table 9 presents an exemplary second (colored) part of an ink composition, using the commercially available carbodiimide "Carbodilite E 02" by Nashinbo, Japan, as an exemplary formaldehyde-free crosslinking agent, according to some embodiments of the present invention.

TABLE 9

| Colored (CMYK) part comprising carbodiimide | |
|---|---|
| A colorant mixture | 10-20% |
| Property-sensitive co-polymerizable agent | 25-30% |
| A first metal oxide (optional if using a third metal oxide) | 10-20% |
| Humectants (glycol mixture) | 20-40% |
| Carbodilite E 02 (as a carbodiimide crosslinking agent) | 0.8-3% |
| Bactericide/Fungicide | 0.1-1% |
| Neutralizing/buffering agent | 0.2-0.6% |
| Defoamer | 0.1 0.6% |
| Wetting agent/surfactant | 0.1-2% |
| Organic solvent | 0-5% |
| Other additives | 0-2% |
| Deionized water | To 100% |
| Tg of the film-forming agent | −35 to 0° C. |
| Viscosity at 34° C. | 10-13 cp |
| pH | 8-8.5 |
| Surface tension | 25-36 N/m |

Table 10 presents an exemplary third (underbase) part of an ink composition, using carbodiimide as an exemplary formaldehyde-free crosslinking agent, according to some embodiments of the present invention.

TABLE 10

| Opaque white (underbase) part comprising carbodiimide | |
|---|---|
| A second metal oxide (acting also as colorant) | 15-20% |
| Property-sensitive co-polymerizable agent | 25-45% |
| An optional co-polymerizable agent | 15-20% |
| Humectants (glycol mixture) | 30-45% |
| Dispersant | 1-6% |
| Bactericide/Fungicide | 0.1-0.5% |
| Carbodilite E 02 (as a dialdehyde crosslinking agent) | 0.8-3% |
| Neutralizing/buffering agent | 0.1-0.2% |
| Defoamer | 0.2-0.4% |
| Wetting agent/surfactant | 0.1-0.5% |
| Organic solvent | 0-5% |
| Other additives | 0-10% |
| Deionized water | To 100% |
| Tg of the film-forming agent | −35 to 0° C. |
| Viscosity at 34° C. | 12-14 cp |
| pH | 8-8.5 |
| Surface tension | 25-36 N/m |

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A process of direct inkjet printing an image on a surface of an object, the process comprising:

contacting at least a part of the surface with a wetting composition so as to provide a wet part of the surface, said wetting composition forming a part of a multi-part liquid ink composition and comprises a property-adjusting agent and a first carrier; and inkjet printing a second part of said multi-part liquid ink composition directly on said wet part of the surface, so as to form the image on said wet part of the surface; or contacting at least a part of the surface with a wetting composition so as to provide a wet part of the surface, said wetting composition comprises a first carrier; inkjet printing a first part of a multi-part ink composition directly on said wet part of the surface, said first part comprises a property-adjusting agent and a first carrier; and inkjet printing a second part of said multi-part liquid ink composition directly on said wet part of the surface so as to form the image on said wet part of the surface; or inkjet printing a first part of a multi-part ink composition directly on a part of the surface, said first pan comprises a property-adjusting agent and a first carrier; and inkjet printing a second part of said multi-part liquid ink composition directly on said part of the surface, so as to form the image on said part of the surface, wherein said second part comprises an emulsified property-sensitive agent, a colorant, a formaldehyde-free crosslinking agent, a co-polymerizable agent and a second carrier, whereas said second part congeals upon contact with said property-adjusting agent when said property-adjusting agent and said second part converge on the substrate;

thereby forming the image.

2. The process of claim 1, being substantially devoid of formaldehyde emission.

3. The process of claim 1, wherein said object is a garment.

4. The process of claim 1, wherein said object is intended for use by infants.

5. The process of claim 1, wherein said formaldehyde-free crosslinking agent is selected from the group consisting of a carbodiimide, a heteroaryl polycarbamate, a diacetone acrylamide/hydrazine and a polyaldehyde.

6. The process of claim 5, wherein said formaldehyde-free crosslinking agent is a carbodiimide.

7. The process of claim 1, wherein said multi-part ink composition further comprises a third part which comprises said emulsified property-sensitive agent, a dispersed metal oxide, said co-polymerizable agent and said formaldehyde-free crosslinking agent, whereas said third part congeals upon contact with said first part.

8. The process of claim 7, wherein said metal oxide is substantially opaque white and selected from the group consisting of titanium dioxide, lead oxide, zinc oxide and molybdenum oxide.

9. The process of claim 1, wherein said ink composition further comprises a co-polymerizable binder, a polymerization catalyst, a buffering agent, a softener/plasticizer, a surface active agent, a surface tension modifying agent, a viscosity modifying agent, a thickener agent, an anticorrosion agent and any combination thereof.

10. The process of claim 1, wherein each of said first carrier and said second carrier is an aqueous carrier.

11. The process of claim 1, further comprising, subsequent to said printing, curing the image.

12. An object having an image printed thereon, the image being printed by the process of claim 1.

13. The object of claim 12, wherein a formaldehyde level exhibited thereby is equal to or less than 20 ppm.

14. A process of direct inkjet printing an image on a surface of an object using a multi-part ink composition, the process comprising:

contacting at least a part of the surface with a first part of the ink composition which comprises a property-adjusting agent and a first carrier so as to provide a wet part of the surface;

inkjet printing a third part of the ink composition which comprises an emulsified property-sensitive agent, a dispersed metal oxide, a co-polymerizable agent, a formaldehyde-free crosslinking agent and a third carrier, whereas said third part congeals upon contact with said first part; and inkjet printing a second part of the ink composition on said wet part of the surface, so as to form the image on said part of the surface, said second part comprises an emulsified property-sensitive agent, a formaldehyde-free crosslinking agent, a co-polymerizable agent, a colorant and a second carrier, whereas said second part congeals upon contact with said first part;

thereby forming the image.

15. The process of claim 14, being substantially devoid of formaldehyde emission.

16. The process of claim 14, wherein said object is a garment.

17. The process of claim 14, wherein said object is intended for use by infants.

18. The process of claim 14, wherein said formaldehyde-free crosslinking agent is selected from the group consisting of a carbodiimide, a heteroaryl polycarbamate, a diacetone acrylamide/hydrazine and a polyaldehyde.

19. The process of claim 18, wherein said formaldehyde-free crosslinking agent is a carbodiimide.

20. The process of claim 14, wherein said metal oxide is substantially opaque white and selected from the group consisting of titanium dioxide, lead oxide, zinc oxide and molybdenum oxide.

21. The process of claim 14, wherein said colored part and/or said third part further comprises a co-polymerizable binder, a polymerization catalyst, a buffering agent, a softener/plasticizer, a surface active agent, a surface tension modifying agent, a viscosity modifying agent, a thickener agent, an anticorrosion agent and any combination thereof.

22. The process of claim 14, wherein each of said first carrier, said second carrier and said third carrier is an aqueous carrier.

23. The process of claim 14, further comprising, subsequent to said printing, curing the image.

24. An object having an image printed thereon, the image being printed by the process of claim 14.

25. The object of claim 14, wherein a formaldehyde level exhibited thereby is equal to or less than 20 ppm.

* * * * *